United States Patent
Sun et al.

(10) Patent No.: US 11,954,093 B2
(45) Date of Patent: Apr. 9, 2024

(54) PERFORMING A TOP-K FUNCTION USING A BINARY HEAP TREE

(71) Applicant: ALIBABA GROUP HOLDING LIMITED, Grand Cayman (KY)

(72) Inventors: Fei Sun, San Mateo, CA (US); Shuangchen Li, San Mateo, CA (US); Dimin Niu, San Mateo, CA (US); Fei Xue, San Mateo, CA (US); Yuanwei Fang, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 134 days.

(21) Appl. No.: 16/892,507

(22) Filed: Jun. 4, 2020

(65) Prior Publication Data

US 2021/0382871 A1    Dec. 9, 2021

(51) Int. Cl.
| | |
|---|---|
| *G06F 16/23* | (2019.01) |
| *G06F 5/16* | (2006.01) |
| *G06F 16/245* | (2019.01) |
| *G06F 16/901* | (2019.01) |

(52) U.S. Cl.
CPC ............ *G06F 16/2379* (2019.01); *G06F 5/16* (2013.01); *G06F 16/245* (2019.01); *G06F 16/9027* (2019.01)

(58) Field of Classification Search
None
See application file for complete search history.

(56) References Cited

U.S. PATENT DOCUMENTS

| | | | | |
|---|---|---|---|---|
| 2009/0144310 A1* | 6/2009 | Ruml | ................... | G06F 16/9027 |
| | | | | 707/E17.05 |
| 2021/0294603 A1* | 9/2021 | Kasture | ................. | G06F 9/3887 |

OTHER PUBLICATIONS

Fadel, R., et al., "Heaps and Heapsort on Secondary Storage", Elsevier, Theoretical Computer Science 220 (1999), pp. 345-362. (Year: 1999).*

(Continued)

*Primary Examiner* — Scott A. Waldron
(74) *Attorney, Agent, or Firm* — Finnegan, Henderson, Farabow, Garrett & Dunner, LLP

(57) ABSTRACT

Embodiments of the disclosure provide devices and methods for performing a top-k function. The device can include: a memory comprising a plurality of register files for storing the data elements, the plurality of register files comprising a parent register file and a first child register file associated with the parent register file, wherein the parent register file is associated with: first interface circuitry configured for reading a first parent data element from the parent register file and receiving a first child data element and a second child data element from the first child register file; and first comparison circuitry configured for updating the parent register file and the first child register file based on the first parent data element, the first child data element, and the second child data element according to a given principle.

19 Claims, 20 Drawing Sheets

(56) References Cited

OTHER PUBLICATIONS

Joshi, Vaidehi, "Heapify All The Things With Heap Sort", blog post published Jul. 13, 2017, available at: https://medium.com/basecs/heapify-all-the-things-with-heap-sort-55ee1c93af82, last accessed Feb. 25, 2022. (Year: 2017).*
Bhagwan, Ranjita & Bill Lin, "Fast and Scalable Priority Queue Architecture for High-Speed Network Switches", 2000 IEEE INFOCOM, pp. 538-547. (Year: 2000).*
Huang, Muhuan, et al., "A Scalable, High-performance Customized Priority Queue", 2014 24th International Conference on Field Programmable Logic and Applications (FPL), 4 pages. (Year: 2014).*

* cited by examiner

240

410

730

PERFORMING A TOP-K FUNCTION USING A BINARY HEAP TREE

BACKGROUND

A top-k function can find K largest or K smallest elements among a plurality of given elements (e.g., N elements). Therefore, the top-k function can be applied in similarity search for a fast region-convolution neural network (RCNN), and the like.

Conventionally, the top-k function is implemented using software. However, with the boom in data over Internet, a software implementation of the top-k function can no longer process a great number of elements within a reasonable period. For example, the number of elements can be over 100,000 and is still growing. As the value of M gets larger, software implementations of the top-k function become too slow.

SUMMARY

Embodiments of the disclosure provide a binary tree device for heapifying data elements. The binary tree device can include: a memory comprising a plurality of register files for storing the data elements, the plurality of register files comprising a parent register file and a first child register file associated with the parent register file, wherein the parent register file is associated with: first interface circuitry configured for reading a first parent data element from the parent register file and receiving a first child data element and a second child data element from the first child register file; and first comparison circuitry configured for updating the parent register file and the first child register file based on the first parent data element, the first child data element, and the second child data element according to a given principle.

Embodiments of the disclosure provide a method for heapifying a binary tree that comprises K nodes distributed across N node levels. The method can include: initializing the K nodes of the binary tree with K initial data elements from a host system, wherein the N node levels comprises a first node level, a second node level that is a child level of the first node level, a third node level that is a child level of the second node level, and a fourth node level that is a child level of the third node level; and heapifying the binary tree, wherein heapifying the binary heap comprises: heapifying nodes of the first node level and the third node level in a first cycle; and heapifying nodes of the second node level in a second cycle.

Embodiments of the disclosure provide a method for heapifying a binary tree that comprises a root node, a number of leaf nodes, and internal nodes between the root node and the leaf nodes. The method can include: initializing the number of leaf nodes of the binary tree with a plurality of initial data elements in a first cycle; storing a first data element from a host system to the root node of the binary tree in a second cycle that is next to the first cycle; and heapifying the binary tree in a third cycle that is next to the second cycle.

Embodiments of the disclosure provide a method for heapifying a binary tree comprising K nodes across N levels, wherein the K nodes comprise a root node, leaf nodes, and internal nodes between the root node and the leaf nodes. The method can include: initializing a given number of the leaf nodes of the binary tree in a first cycle, wherein the given number is an integer equal to or greater than $(\log_2^{(K+1)}-1)$; storing a first data element from the host system to the root node of the binary tree in a second cycle; and heapifying the binary tree in a third cycle.

Embodiments of the disclosure provide a method for heapifying a binary tree that comprises a plurality of nodes having a root node, leaf nodes, and internal nodes distributed across a plurality of levels, the plurality of node levels comprising a root level corresponding to the root node, internal levels corresponding to the internal nodes, and a leaf level corresponding to the leaf nodes, in an order from a low level to a high level. The method can include: initializing nodes in a first node level in the plurality of node levels in a first cycle; initializing a parent node in a second node level that is a parent level of the first node level in a second cycle; and heapifying a sub-tree associated with the parent node in a third cycle.

It is to be understood that both the foregoing general description and the following detailed description are exemplary and explanatory only and are not restrictive of the disclosed embodiments, as claimed.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Particular aspects of the present disclosure are described in greater detail below. The terms and definitions provided herein control, if in conflict with terms or definitions incorporated by reference.

Embodiments of the present disclosure provide devices and methods for performing a top-k function using a binary tree.

Figure 1A:
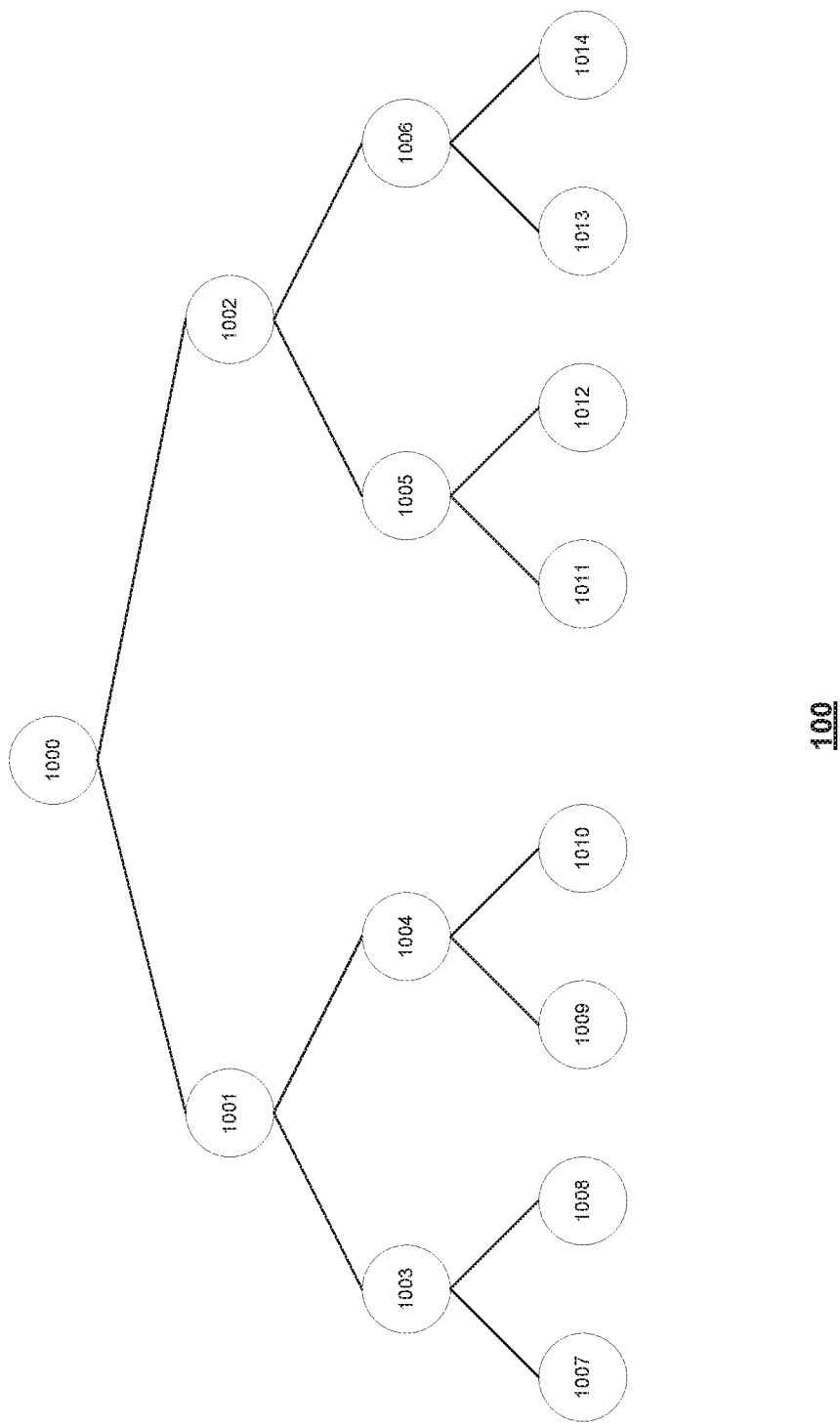
FIG. 1A illustrates an exemplary binary tree, according to some embodiments of the disclosure.

FIG. 1A illustrates an exemplary binary tree 100, according to some embodiments of the disclosure. Binary tree 100 can be part of a host system, which will be further described.

A binary tree can have a plurality of nodes (e.g., K nodes) distributed across a plurality of levels (e.g., N levels). More particularly, the binary tree can include a root node at a root level, leaf nodes at a leaf level, and internal nodes at internal levels. The root node is a node that has child nodes but no parent nodes. For example, in binary tree 100 of FIG. 1A, node 1000 is a root node. The leaf node is a node that has a parent node but no child nodes. For example, in binary tree 100 of FIG. 1A, nodes 1007-1014 are leaf nodes. In some embodiments, the leaf nodes can include storage circuitry (e.g., a register) for storing data elements but no logic circuitry for processing the data elements. In some embodiments, the leaf nodes can be implemented as part of a memory.

Figure 1B:
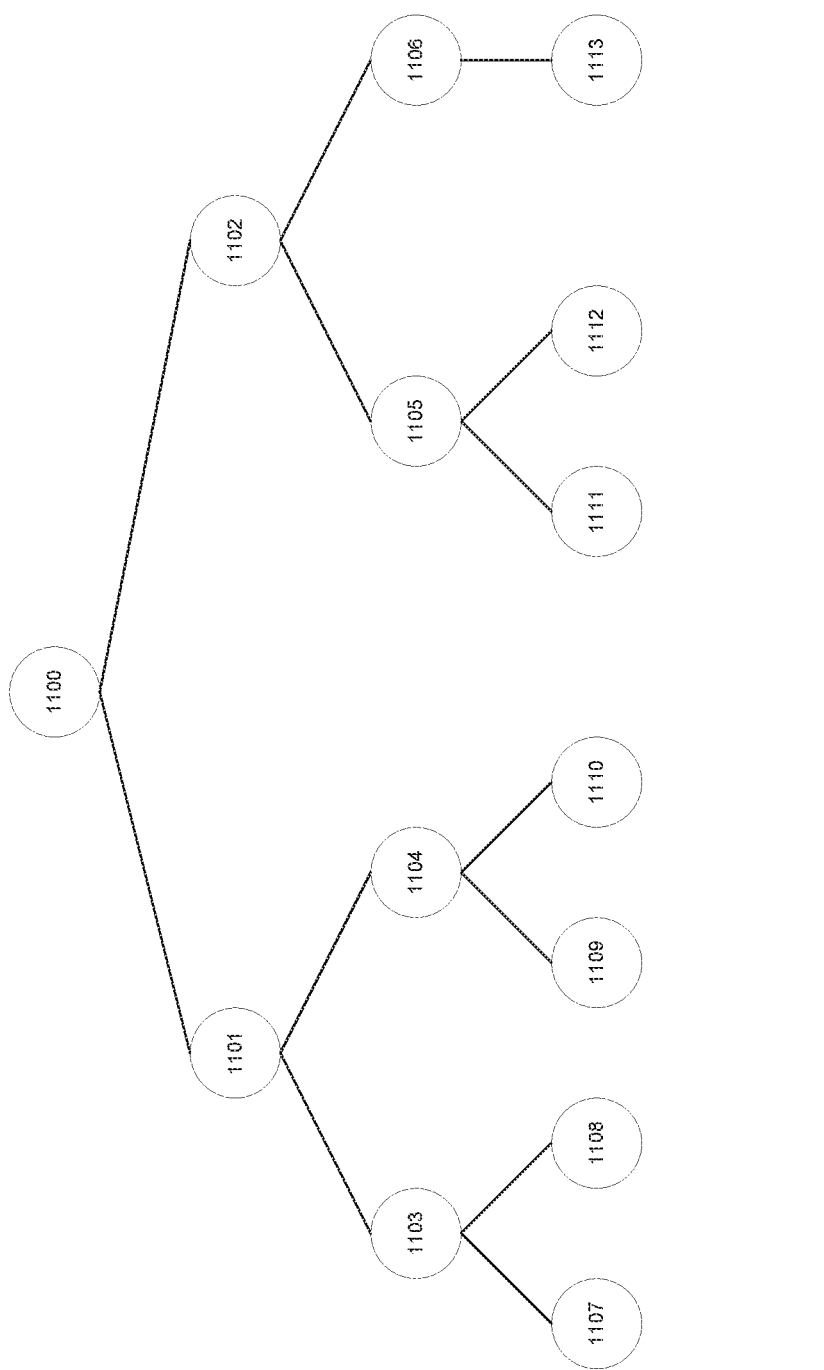
FIG. 1B illustrates another exemplary binary tree, according to some embodiments of the disclosure.

In some embodiments, a binary tree may not be full. For example, a binary tree may not have a full binary structure at the leaf level. FIG. 1B illustrates another exemplary binary tree 101, according to some embodiments of the disclosure. As shown in FIG. 1B, binary tree 101 can include a plurality of nodes 1100-1113, among which, 7 leaf nodes 1107-1113 are provided at the leaf level. And compared to binary tree 100 of FIG. 1A having a full binary structure at the leaf level, binary tree 101 is not full. It is appreciated that a binary tree can have even less leaf nodes than binary tree 101.

The internal nodes are nodes between the root node and the leaf nodes. For example, in binary tree 100, nodes 1001-1006 are the internal nodes. In some embodiments, an internal node is a parent of two child nodes. For example, node 1002 is a parent node to nodes 1005 and 1006. As another example, on the other hand, node 1006 itself is a parent node to leaf nodes 1013 and 1014. Therefore, a child node can be an internal node or a leaf node.

For the non-leaf nodes (e.g., the root node and the internal nodes), a non-leaf node can include storage circuitry for storing a data element in the non-leaf node and logic circuitry (e.g., a comparator) for processing data elements. In an elemental binary structure, the non-leaf node can function as a parent node (e.g., node 1002 of FIG. 1A) associated with at least one child node (e.g., nodes 1005 and 1006 of FIG. 1A). Thus, the data element stored in the non-leaf node can be referred to as a parent data element, and similarly, a data element stored in a child node can be referred to as child data element. In addition, a data element to be pushed to the elemental binary structure can be referred to an external data element. The data elements that the logic circuitry processes can include the parent data element of the non-leaf node and child data elements read from the child nodes. It is appreciated that a binary tree (e.g., tree 100 or 101) can include more than one elemental binary structure, and a child node of a first elemental binary structure can function as a parent node of a second elemental binary structure. For example, node 1005 is a parent node of an elemental binary structure of nodes 1005, 1011, and 1012, while node 1005 is also a child node of node 1002.

A binary tree can include N node levels, and each internal node can be associated with two child nodes in a child level. As shown in FIG. 1A, binary tree 100 includes 4 node levels (i.e., N=4). A first node level includes root node 1000, a second node level includes nodes 1001 and 1002, a third node level includes nodes 1003-1006, and a fourth node level includes nodes 1007-1014. It is appreciated that a number of nodes at a level can be determined based on an order of the level. For example, a $n^{th}$ level can include $2^{n-1}$ nodes. That is, in binary tree 100, the first node level, which is the root level, includes 1 node, the second node level includes 2 nodes, the third node level includes 4 nodes, and the fourth node level, which is the leaf level, includes 8 nodes. As discussed above, the leaf level may not be a full binary structure and may include less than $2^{n-1}$ nodes. Details of a node will be further described.

Figure 1C:
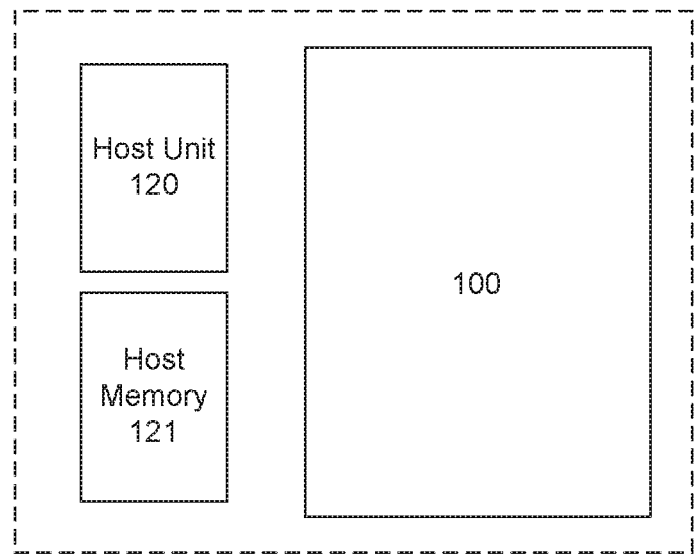
FIG. 1C illustrates a schematic diagram of an exemplary host system having a binary tree, according to some embodiments of the disclosure.

Binary tree 100 can be incorporated as part of a host system. FIG. 1C illustrates a schematic diagram of an exemplary host system 110 having binary tree 100, according to some embodiments of the disclosure.

In addition to binary tree 100, host system 110 can further include a host unit 120 and a host memory 121.

Host unit 120 can be one or more processing unit (e.g., an X86 central processing unit). As shown in FIG. 1C, host unit 120 may be associated with host memory 121. In some embodiments, host memory 121 may be an integral memory or an external memory associated with host unit 120. In some embodiments, host memory 121 may comprise a host disk, which is an external memory configured to provide additional memory for host unit 120. Host memory 121 can be a double data rate synchronous dynamic random-access memory (e.g., DDR SDRAM) or the like. Host memory 121 can be configured to store a large amount of data with slower access speed, compared to the on-chip memory integrated within accelerator chip, acting as a higher-level cache. The data stored in host memory 121 may be transferred to binary tree 100. In some embodiments, host memory 121 further include a queue for storing data elements to be transferred to binary tree 100.

In some embodiments, a host system having host unit 120 and host memory 121 can comprise a compiler (not shown). The compiler is a program or computer software that transforms computer codes written in one programming language into commands for binary tree 100 and host unit 120 to create an executable program. In some embodiments, host system including the compiler may push one or more commands to binary tree 100 of FIG. 1A or binary tree 101 of FIG. 1B. For example, the commands can include a signal for causing a binary tree to perform a process for heapifying data elements of the binary tree into a binary heap tree. In heapifying the data elements of the binary tree, the data elements of the binary tree can be sorted to form a maximum binary heap tree or a minimum binary heap tree. In a maximum binary heap tree including at least one elemental binary structure, a parent data element of the elemental binary structure is greater than or equal to its child node(s). In a minimum binary heap tree including at least one elemental binary structure, a parent data element of the elemental binary structure is less than or equal to its child node(s).

It is appreciated that the first few commands received by binary tree 100 may instruct binary tree 100 to load data from host memory 121 into one or more nodes (e.g., node 1000 of FIG. 1A) for initialization.

Figure 1D:
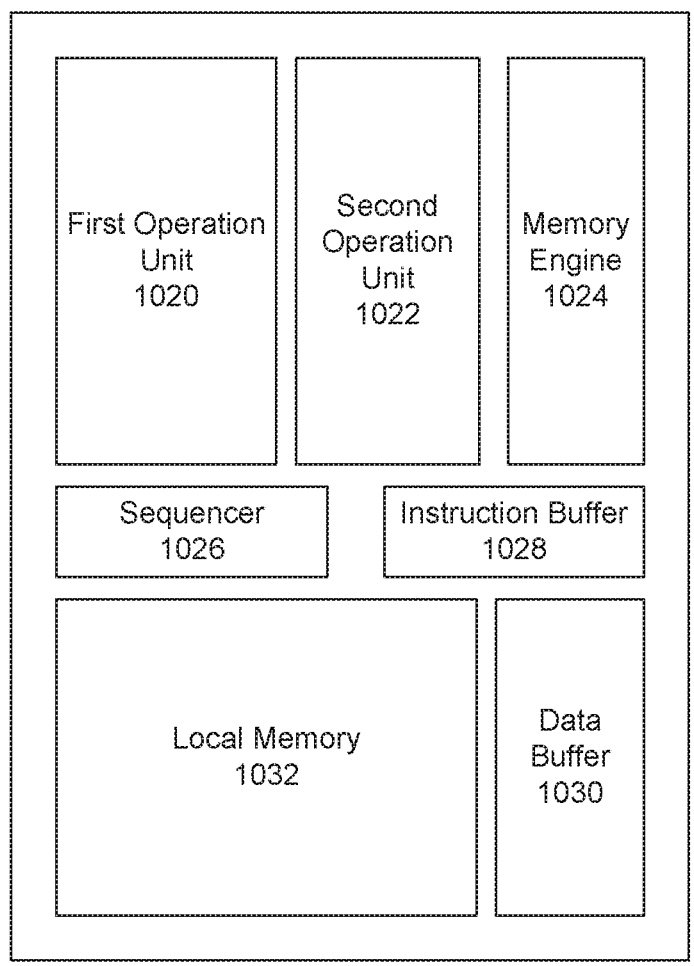
FIG. 1D illustrates a schematic diagram of an exemplary host unit, according to some embodiments of the disclosure.

FIG. 1D illustrates a schematic diagram of an exemplary host unit 120, according to some embodiments of the disclosure. As shown in FIG. 1D, host unit 120 can include one or more operation units such as first and second operation units 1020 and 1022, a memory engine 1024, a sequencer 1026, an instruction buffer 1028, a constant buffer 1030, a local memory 1032, or the like.

Memory engine 1024 can be configured to perform a data operation with binary tree 100. For example, memory engine 1024 can perform data copy from host memory 121 into a node of binary tree 100. Memory engine 1024 can also be configured to sort an order of data elements before queuing the data elements.

Sequencer 1026 can be coupled with instruction buffer 1028 and configured to retrieve commands and distribute the commands to components of binary tree 100. For example, sequencer 1026 can distribute commands to first operation unit 1020, second operation unit 1022, or memory engine 1024. In some embodiments, first operation unit 1020, second operation unit 1022, and memory engine 1024 can run in parallel under control of sequencer 1026 according to instructions stored in instruction buffer 1028.

Instruction buffer 1028 can be configured to store instructions for binary tree 100. In some embodiments, instruction buffer 1028 is coupled with sequencer 1026 and provides instructions to the sequencer 1026. In some embodiments, instructions stored in instruction buffer 1028 can be transferred or modified by command processor 104.

Data buffer 1030 can be configured to store data, such as constant values. In some embodiments, the constant values stored in data buffer 1030 can be used by operation units such as first operation unit 1020 or second operation unit 1022.

Local memory 1032 can provide storage space with fast read/write speed. To reduce possible interaction with a global memory, storage space of local memory 1032 can be implemented with large capacity. With the massive storage space, most of data access can be performed with reduced latency caused by data access. In some embodiments, to minimize data loading latency and energy consumption, SRAM (static random access memory) integrated on chip can be used as local memory 1032. In some embodiments, local memory 1032 can have a capacity of 192 MB or above. According to some embodiments of the disclosure, local memory 1032 be evenly distributed on chip to relieve dense wiring and heating issues. In some embodiments, local memory 1032 can store data elements to be heapified in a heapifying process.

Figure 1E:
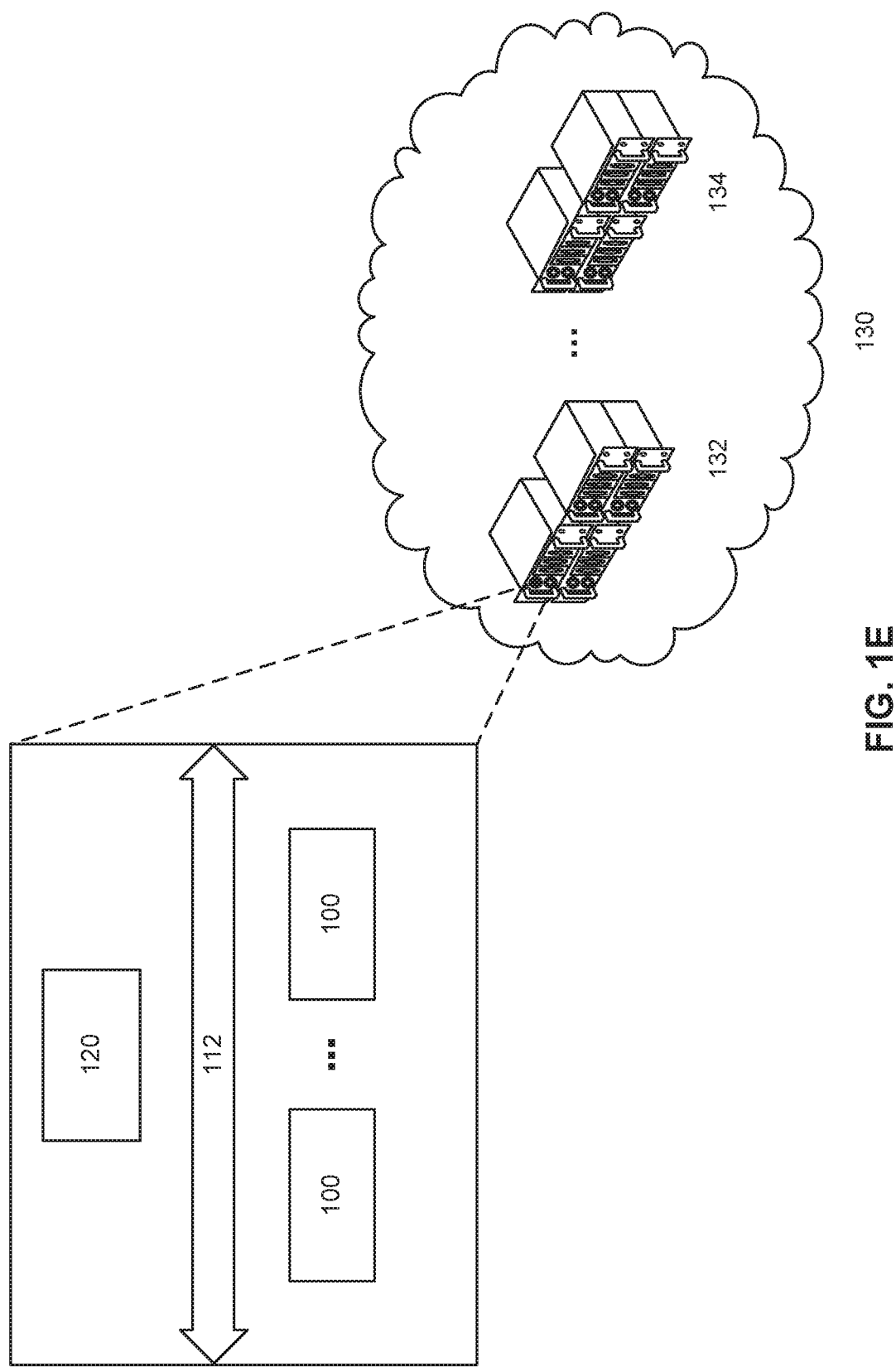
FIG. 1E illustrates a schematic diagram of an exemplary cloud system, according to some embodiments of the disclosure.

FIG. 1E illustrates a schematic diagram of an exemplary cloud system 130 incorporating host system 110, according to some embodiments of the disclosure. As shown in FIG. 1E, cloud system 130 can provide a cloud service and can include a plurality of computing servers (e.g., 132 and 134).

With the assistance of binary tree 100, cloud system 130 can provide the extended capabilities of performing the top-k function. It is appreciated that, binary tree 100 can be deployed to computing devices in other forms. For example, binary tree 100 can also be integrated in an off-line work station.

In addition to providing the top-k function based on binary tree 100, cloud system 130 can further incorporate other accelerators (e.g., a neural network processing unit (NPU)) to provide other functions (e.g., machine learning function).

Figure 2A:
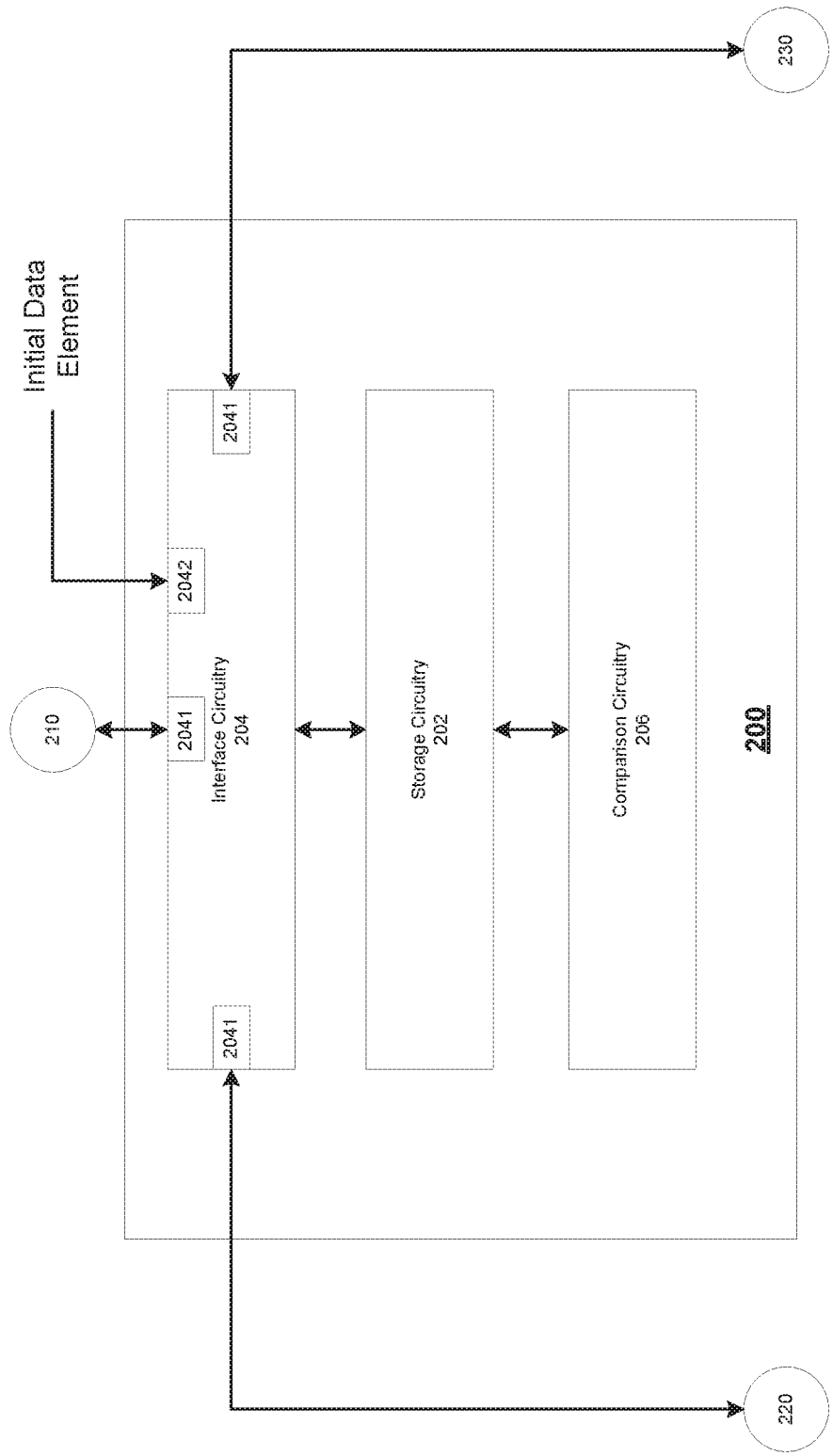
FIG. 2A illustrates a schematic diagram of an exemplary node of a binary tree having K nodes, according to some embodiments of the disclosure.

FIG. 2A illustrates a schematic diagram of an exemplary node 200 of a binary tree having K nodes, according to some embodiments of the disclosure.

Node 200 can include storage circuitry 202 and interface circuitry 204. In some embodiment, when node 200 is a non-leaf node, node 200 can further include comparison circuitry 206.

Storage circuitry 202 can store a data element for node 200. In some embodiments, when node 200 is a root node (e.g., node 1000 of FIG. 1A), a data element can be stored to node 200 by external circuitry (e.g., a host system). When node 200 is an internal node (e.g., node 1006 of FIG. 1A), a data element can be assigned to node 200 in advance. For example, a data element of 0xFF can be assigned to nodes of the binary tree when the binary tree is being initialized. As another example, K data elements (e.g., first K data elements) among a plurality of data elements can be assigned to K nodes of the binary tree, when the binary tree is being initialized. The data element of node 200 can also be determined during a previous iterative loop of the heapifying process.

In some embodiments, storage circuitry of a node can be a register, and a plurality registers of a plurality of nodes of a binary tree can form a register file. For example, registers of nodes at a same level can form one or more register files to provide storage for data elements of these nodes. The register file can be physically part of a node (e.g., exemplary node 200) of a binary tree or external to the node.

Interface circuitry 204 of node 200 can be communicatively coupled with a first child node 220 (e.g., node 1013 of FIG. 1A), and a second child node 230 (e.g., node 1014 of FIG. 1A), and configured to transceive data elements with first child node 220 and second child node 230. For example, an interface 2041 implemented by interface circuitry 204 can be configured to read a first child data element from first child node 220 and a second child data element from second child node 230. An interface 2042 implemented by interface circuitry 204 can also be communicatively coupled with external circuitry 210. External circuitry 210 can be a parent of node 200 or a host system. For example, interface circuitry 204 can send a data element of node 200 to a parent node of node 200.

In some embodiments, an interface 2042 implemented by interface circuitry 204 can be further configured to receive an initial data element for initializing node 200. For example, the initial data element can be sent from the host system.

Interface circuitry 204 can be implemented using at least one flip-flop. For example, a flip-flop connected with a multiplexer can be used to transceive data elements with other nodes and receive the initial value. As another example, a first flip-flop can be used for transceiving data elements with other nodes, and a second flip-flop can be used for receiving the initial value.

When node 200 is a non-leaf node, node 200 can further include comparison circuitry 206. Comparison circuitry 206 can be configured for updating the data element of non-leaf node 200 based on the first and second child data elements of first child node 220 and second child node 230 according to a given principle. The given principle is associated with a type of a binary tree. The type of the binary tree can indicate a type of the binary heap tree formed from the binary tree after the heapifying. Thus, the type of a binary tree can also be referred to as a type of the binary heap tree. When the type of the binary heap tree is a "maximum" binary heap tree, the date element of a node is greater than or equal to those of its child nodes. Therefore, in this case, the given principle can include selecting a maximum data element among the parent data element, the first child data element, and the second child data element. When the type of the binary heap tree is a "minimum" binary heap tree, the date element of a node is less than or equal to those of its child nodes. Therefore, in this case, the given principle can include selecting a minimum data element among the parent data element, the first child data element, and the second child data element.

In some embodiments, comparison circuitry 206 can read the parent data element, the first child data element, and the second child data element, and determine a greater or less data element between two of the three data elements. Below describes an exemplary non-leaf node of a minimum binary heap tree updating the non-leaf node's data element. It is appreciated that a non-leaf node of a maximum binary heap tree functions similarly.

Figure 2B:
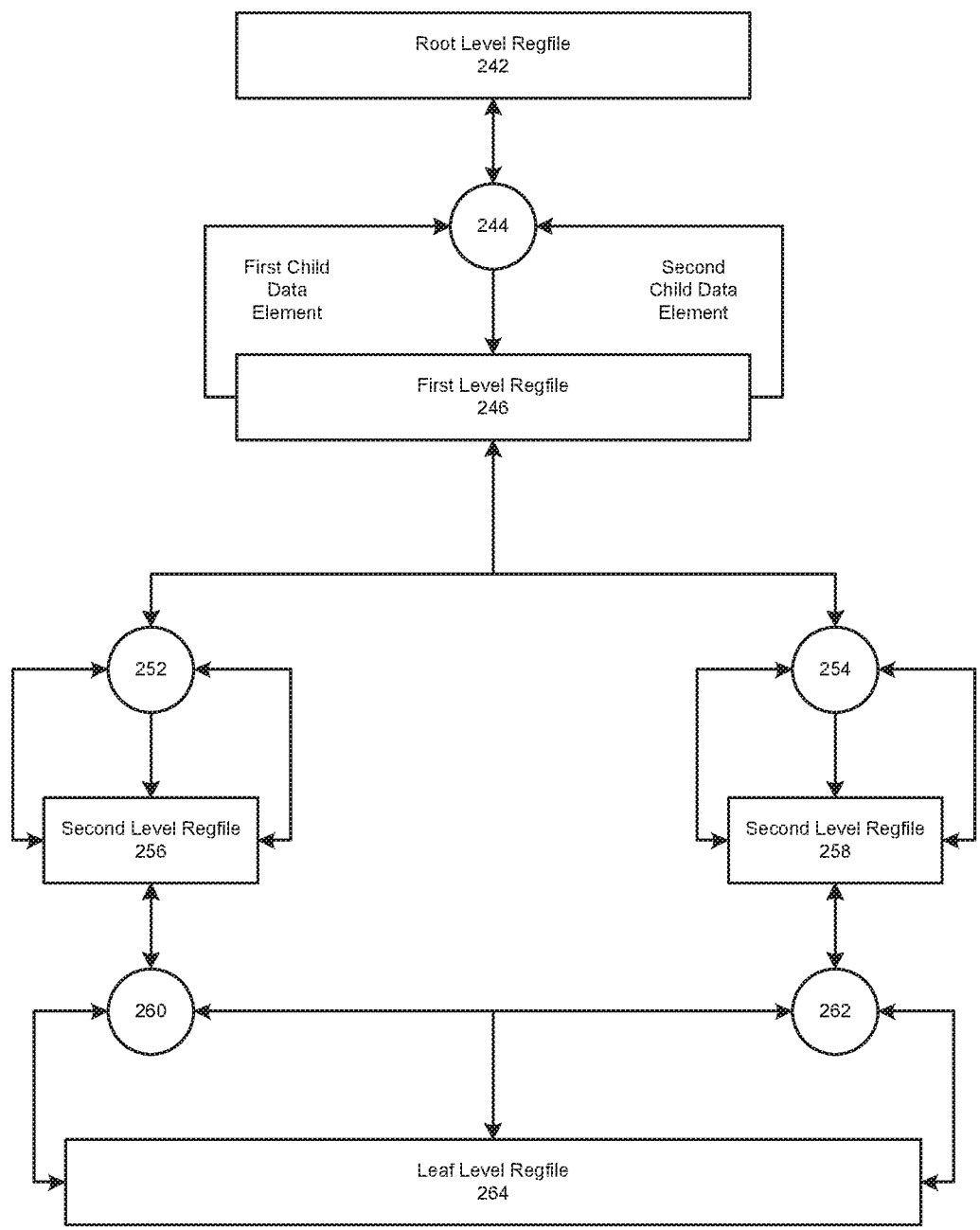
FIG. 2B illustrates another exemplary binary tree, according to some embodiments of the disclosure.

As discussed above, a binary tree can include N levels, each having at least one node. In some embodiments, data element(s) of node(s) at a level can be stored in a same register file with corresponding register index. And non-leaf nodes at a same level can share the same comparison circuitry. FIG. 2B illustrates another exemplary binary tree 240, according to some embodiments of the disclosure. Binary tree 240 is another implementation of binary tree 100.

In binary tree 240 of FIG. 2B, a register file (e.g., storage circuitry 202) is configured to function as storage circuitry for nodes at a level, and a comparator (e.g., comparison circuitry 206) is configured to be multiplexed by the nodes at the level.

For example, as shown in FIG. 2B, a root node (e.g., root node 1000) can include a root level register file 242 for storing a parent data element and a comparator 244 for receiving a first child data element and a second child data element from a first level register file 246 and heapifying the parent data element and the first and second child data elements. It is appreciated that, during the heapifying, comparator 244 can write data elements back to root level register file 242 and first level register file 246.

As it can also be seen from FIG. 2B, nodes of a level can be associated with multiple register files and comparators. Using binary tree 100 of FIG. 1A as a reference, nodes 1003-1006 are implemented by two register files (i.e., second level register files 256 and 258) and two comparators (i.e., comparators 260 and 262). In some embodiments, second level register file 256 and comparator 260 can implement nodes 1003 and 1004, and second level register file 258 and comparator 262 can implement nodes 1005 and 1006.

Figure 3:
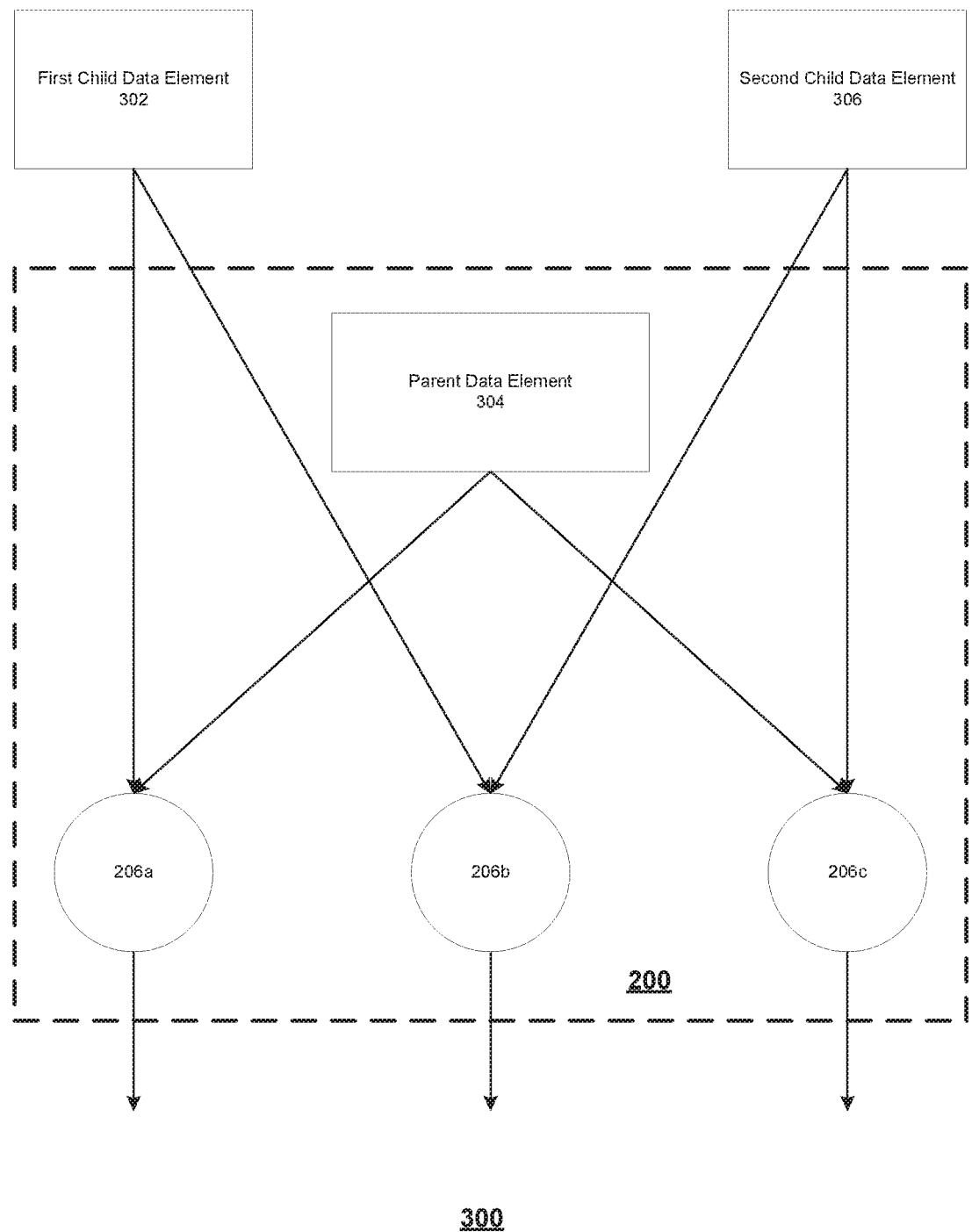
FIG. 3 illustrates an exemplary schematic diagram of updating a parent data element of a non-leaf node, according to some embodiments of the disclosure.

FIG. 3 illustrates an exemplary schematic diagram of updating a parent data element of a non-leaf node 300, according to some embodiments of the disclosure.

As shown in FIG. 3, comparison circuitry 206a can receive a first child data element 302 from a first child node and a parent data element 304 from non-leaf node 200, and determine whether parent data element 304 is less than or equal to first child data element 302. Parent data element 304 can be the current data element hosted by non-leaf node 200. In some embodiments, based on the determination, comparison circuitry 206a can generate a first indication signal. For example, in response to parent data element 304 meets the above condition of parent data element 304 being less than or equal to first child data element 302, the first indication signal can be "1." Otherwise, the first indication signal can be "0."

Similarly, comparison circuitry 206b can receive first child data element 302 from the first child node and a second child data element 306 from a second child node and determine whether first child data element 202 is less than or equal to second child data element 306. In some embodiments, based on the determination, comparison circuitry 206b can generate a second indication signal. In response to first child data element 302 meeting the above condition of first child data element 302 being less than or equal to second child data element 306, the second indication signal can be "1." Otherwise, the second indication signal can be "0."

And comparison circuitry 206c can receive parent data element 304 and second child data element 306 and determine whether parent data element 304 is less than or equal to second child data element 306. In some embodiments, based on the determination, comparison circuitry 206c can generate a third indication signal. For example, in response to parent data element 304 meets the above condition of parent data element 304 being less than or equal to second child data element 306, the third indication signal can be "1." Otherwise, the third indication signal can be "0."

Though FIG. 3 illustrates three comparison circuitry 206a-206c, it is appreciated that one comparison circuitry 206 can be used for comparing the data elements. For example, comparison circuitry 206 can receive the three data elements from a multiplexer (not shown) and sequentially perform comparison on two of the three data elements.

Figure 4A:
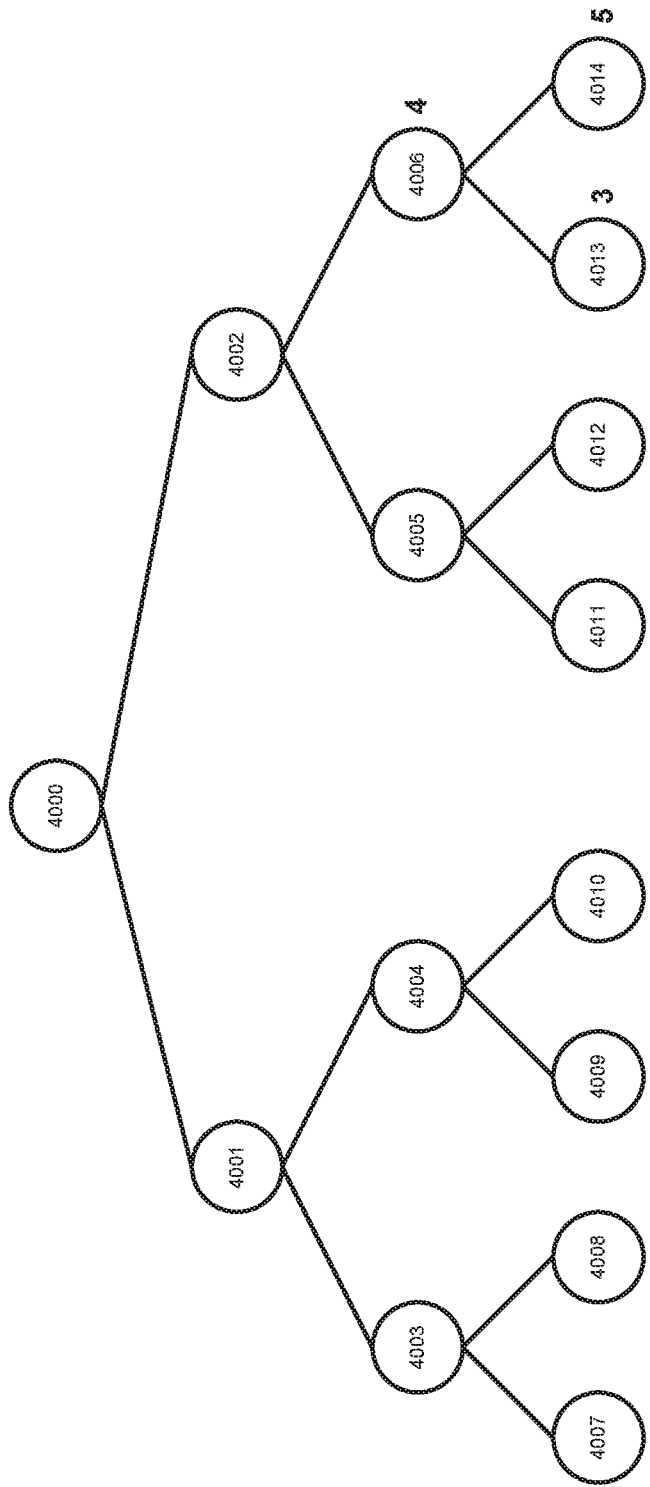
FIG. 4A illustrates an exemplary binary tree, according to some embodiments of the disclosure.

Based on the first, second, and third indication signals, a minimum data element among first child data element 302, parent data element 304, and second child data element 306 can be determined. FIG. 4A illustrates an exemplary binary tree 400, according to some embodiments of the disclosure. For example, assuming that parent data element 304 of "4" is assigned to node 4006, first child data element 302 of "3" is assigned to node 4013, second child data element 306 of "5" is assigned to node 4014, as shown in FIG. 4A, comparison circuitry 206 can determine that first child data element of "3" is the minimum data element.

Then, comparison circuitry 206 of FIG. 3 can update node 4006 based on the above determinations.

Thus, heapifying a node can include receiving a parent data element for the node, a first child data element for a first child node of the node, and a second child data element for a second child data of the node, determining a maximum or minimum data element among those three data elements, and updating the node using the determined maximum or minimum data element.

Figure 4B:
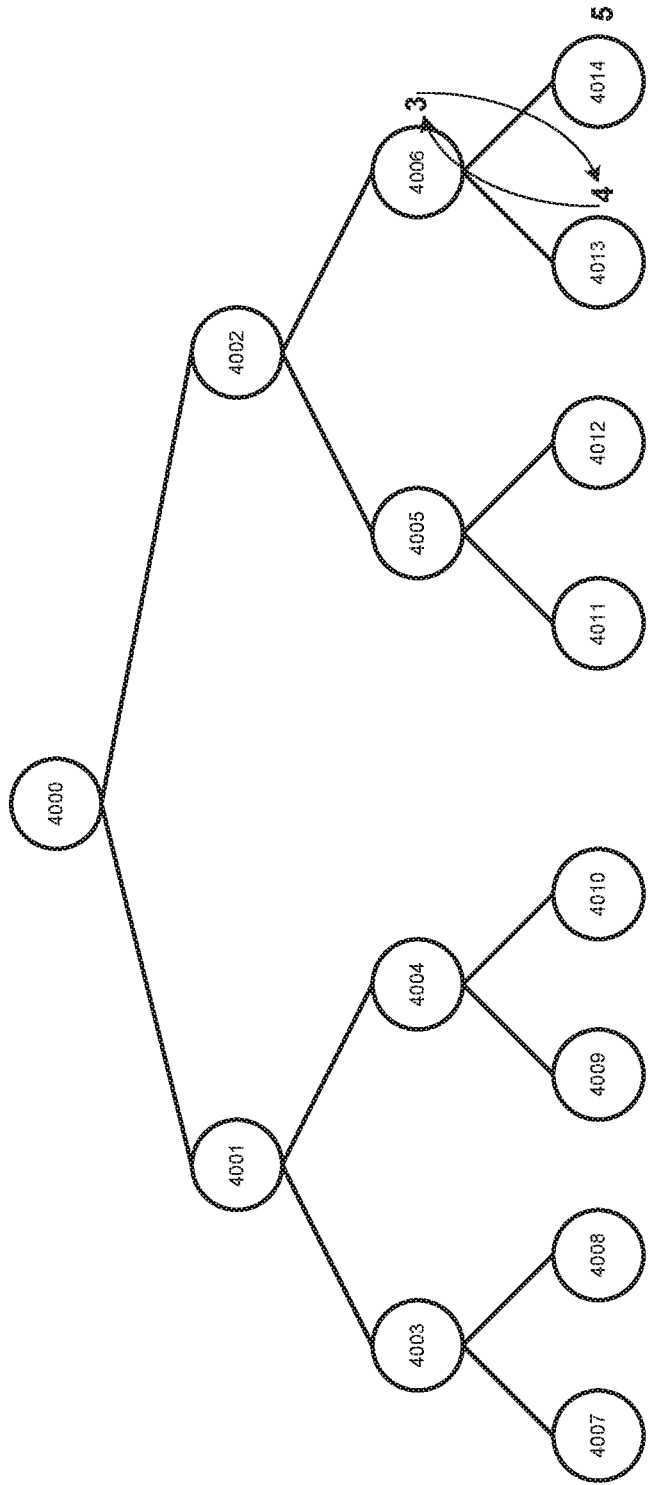
FIG. 4B illustrates an exemplary binary tree after heapifying, according to some embodiments of the disclosure.

FIG. 4B illustrates an exemplary binary tree 410 after heapifying, according to some embodiments of the disclosure. Comparison circuitry 206 can update node 4006 based on the first, second, and third indication signals. For example, in the above example, when first child data element 302 of "3" is determined to be the minimum data element, comparison circuitry 206 can swap data elements between the first child node 4013 and parent node 4006. That is, parent data element 304 of parent node 4006 can be updated to be "3," and first child data element 302 of the first child node 4013 can be updated to be "4."

Therefore, by assigning data elements to a binary tree and heapifying the binary tree, a root data element of a root node in the binary tree can be a minimum/maximum data element of all data elements in the binary heap tree after the heapifying, depending on whether the binary heap tree is a maximum binary heap tree or a minimum binary heap tree. For example, when the binary heap tree is a maximum binary heap tree, the root data element of the root node is a maximum data element among all data elements in the maximum binary heap tree.

When a new data element is pushed to the binary tree in a first cycle, the new data element can be compared with the root data element. If the new data element is greater than or equal to the root data element, the new data element can be skipped. In other words, a new data element cannot be taken in the binary tree to be heapified into a maximum binary heap tree, unless the new data element is less than root data element. If the new data element is less than the root data element, the new data element can be pushed to the root node of the binary tree to be heapified into a maximum binary heap tree.

Then, in a second cycle, the data elements of the binary tree can be heapified. That is, comparison circuitry of the root node can compare the new root data element with two child data elements of the root node and determine whether the new root data element should be swapped with any of the two child data elements. It is appreciated that the first and second cycles can be the machine cycles of the host system where the binary tree is incorporated.

The above process can be repeated until all data elements are heapified. As a new data element can be taken in the maximum binary heap tree only when the new data element is less than the root data element, data elements contained in the final binary heap tree are the smallest data element among all data elements.

Similarly, a minimum binary heap tree can be used to determine a number of largest data elements among all data elements.

As discussed above, the pushing of a new data element to a binary tree and the heapifying of the binary tree are performed in two separate cycles. That is, heapifying can be performed in half of the cycles. To increase the efficiency of heapifying a binary tree, embodiments of the disclosure are further provided below.

Figure 5:
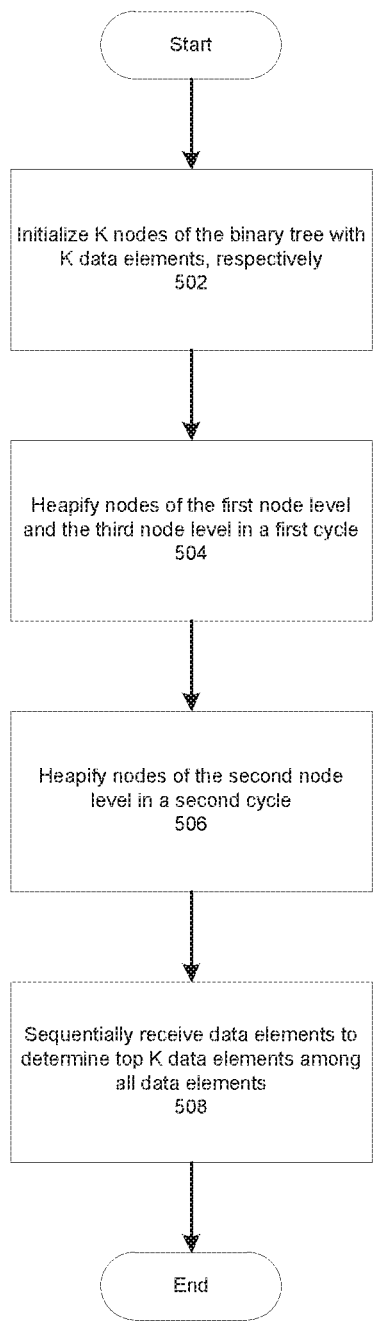
FIG. 5 illustrates a flowchart of an exemplary method for heapifying a binary tree, according to some embodiments of the disclosure.

FIG. 5 illustrates a flowchart of an exemplary method 500 for heapifying a binary tree, according to some embodiments of the disclosure. Method 500 can be performed by a binary tree (e.g., binary tree 100 of FIG. 1), which includes K nodes distributed across N node levels. The N node levels include a first node level having at least one node, a second node level that includes child nodes of the first node level, a third node level that includes child nodes of the second node level, and a fourth node level that includes child nodes of the third node level. Method 500 can include steps as below.

At step 502, K nodes of the binary tree can be initialized with K data elements, respectively. The initial K data elements can be part of a plurality of data elements on which a Top-k function can be performed. For example, the K data elements can be first K data elements of the plurality of data elements. As discussed above with reference to FIGS. 1-3, interface circuitry of the K nodes can be configured to receive these K data elements.

After the initialization, the binary tree can be heapified.

At step 504, nodes of the first node level and the third node level can be heapified in a first cycle. It is appreciated that the first node level can be a root level. In that case, the first node level only includes the root node. If the first node level is not a root level, the first node level can include at least two nodes. By heapifying the first node level or the third node level, nodes in the first node level or the third node level can be updated.

At step 506, nodes of the second node level can be heapified in a second cycle. The second cycle can be a cycle that is next to the first cycle. It is appreciated that, when the fourth node level is not a leaf level consisted of leaf nodes, the fourth node level can also be heapified in the second cycle.

The above steps 504 and 506 can be performed repeatedly until the initial data elements of the binary tree are heapified. In other words, the first and third node levels and the second node level can be heapified in an interleaving manner. In some embodiments, the heapifying of the initial data elements in L node levels can take at least 2×L−1 cycles.

At step 508, the binary tree can sequentially receive data elements to determine a number of top data elements (e.g., K top data elements) among all data elements. The top K data elements can be the greatest K data elements or the smallest K data element among the plurality of data elements, depending on a type of the binary tree. As discussed above, when the type of the binary tree is a maximum binary heap tree, the top K data elements are the smallest K data elements among the plurality of data elements. When the type of the binary tree is a minimum binary heap tree, the top K data elements are the greatest K data elements among the plurality of data elements.

Figure 6:
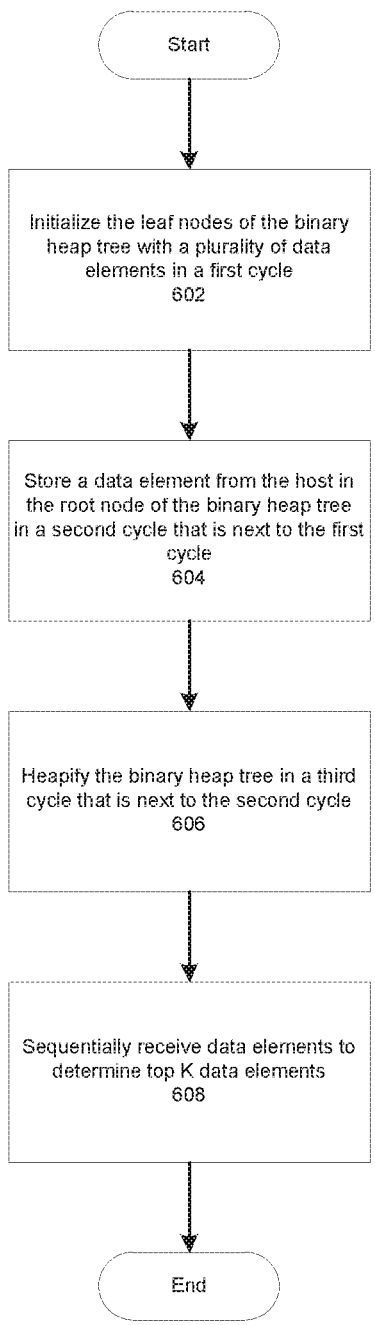
FIG. 6 illustrates a flowchart of another exemplary method for heapifying a binary tree, according to some embodiments of the disclosure.

FIG. 6 illustrates a flowchart of an exemplary method 600 for heapifying a binary heap tree, according to some embodiments of the disclosure. Method 600 can be performed by a binary tree (e.g., binary tree 100 of FIG. 1A), which includes a root node, leaf nodes, and internal nodes between the root node and the leaf nodes. Method 600 can include steps as below.

At step 602, the leaf nodes of the binary tree can be initialized with a plurality of data elements in a first cycle. For example, the binary tree can include e.g., $2^{N-1}$ leaf nodes, N being the number of layers in the binary tree, and thus $2^{N-1}$ data elements can be assigned to the leaf nodes at step 602. The $2^{N-1}$ data elements are part of a plurality of data elements on which a Top-k function can be performed. As discussed above with reference to FIGS. 1-3, interface circuitry of the $2^{N-1}$ leaf nodes can be configured to receive these $2^{N-1}$ data elements. It is appreciated that the number of all nodes in the binary tree $K=2^N+1$. Therefore, the leaf nodes occupy $$\frac{2^{N-1}}{2^N+1}$$

of all nodes in the binary tree. When K is very large (e.g., millions), the leaf nodes occupy about 50% of all nodes in the binary tree. In other words, about 50% of the nodes in the binary tree are filled at step 602, therefore reducing cycle overhead for heapifying a binary tree.

At step 604, the root node of the binary tree can store a data element from the host system (e.g., host system 110 of FIG. 1C) in a second cycle that is next to the first cycle. As discussed above, the host system can store data elements to be processed in a queue, and sequentially send the data elements to the binary tree. For example, step 604 can be performed in a first cycle.

At step 606, the binary tree can be heapified in a third cycle that is next to the second cycle. It is appreciated that, the heapifying of the binary tree can be performed in a second cycle.

The above steps 604 and 606 can be performed repeatedly until K nodes of the binary tree are filled with first K data elements from the host system.

At step 608, the binary tree can sequentially receive data elements to determine top K data elements among all data elements that has been processed by the binary tree. The top K data elements can be the greatest K data elements or the smallest K data element among the plurality of data elements, depending on a type of the binary tree. As discussed above, when the binary tree is a maximum binary heap tree, the top K data elements are the smallest K data elements among the plurality of data elements. When the binary heap tree is a minimum binary heap tree, the top K data elements are the greatest K data elements among the plurality of data elements.

Figure 7A:
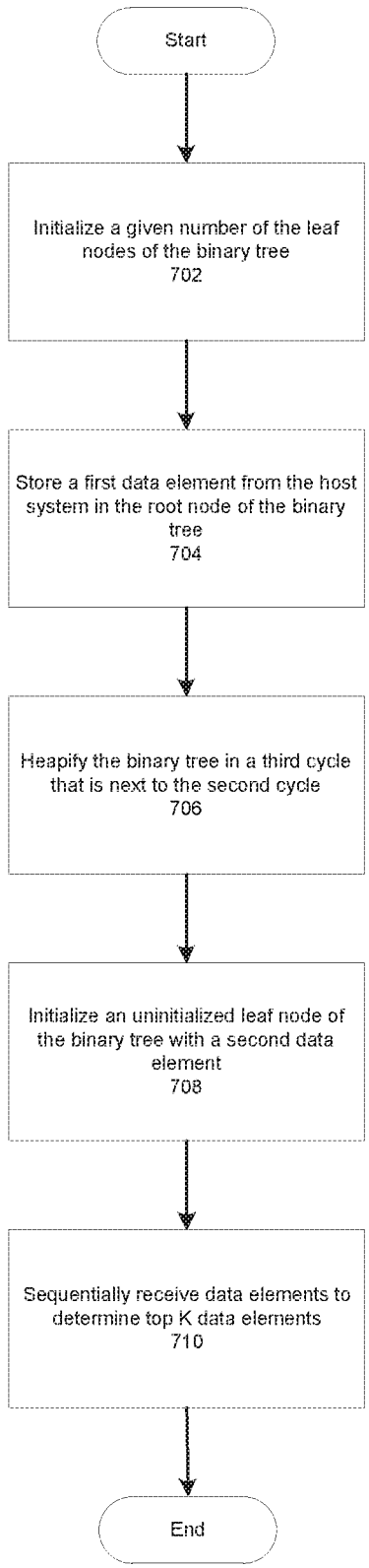
FIG. 7A illustrates a flowchart of another exemplary method for heapifying a binary tree, according to some embodiments of the disclosure.

FIG. 7A illustrates a flowchart of an exemplary method 700 for heapifying a binary tree, according to some embodiments of the disclosure. Method 700 can be performed by a binary tree (e.g., binary tree 100 of FIG. 1A), which includes a root node, leaf nodes, and internal nodes between the root node and the leaf nodes. The binary tree can include K nodes across N levels. Method 700 can include steps as below.

At step 702, a given number of the leaf nodes of the binary tree can be initialized. The number is associated with the number of nodes in the binary tree. In some embodiments, the given number of leaf nodes to be initialized can be equal to or greater than roof ($\log_2^{(K+1)}-1$). For example, the given number of initial data elements from the host system can be used for the initialization.

Figure 7B:
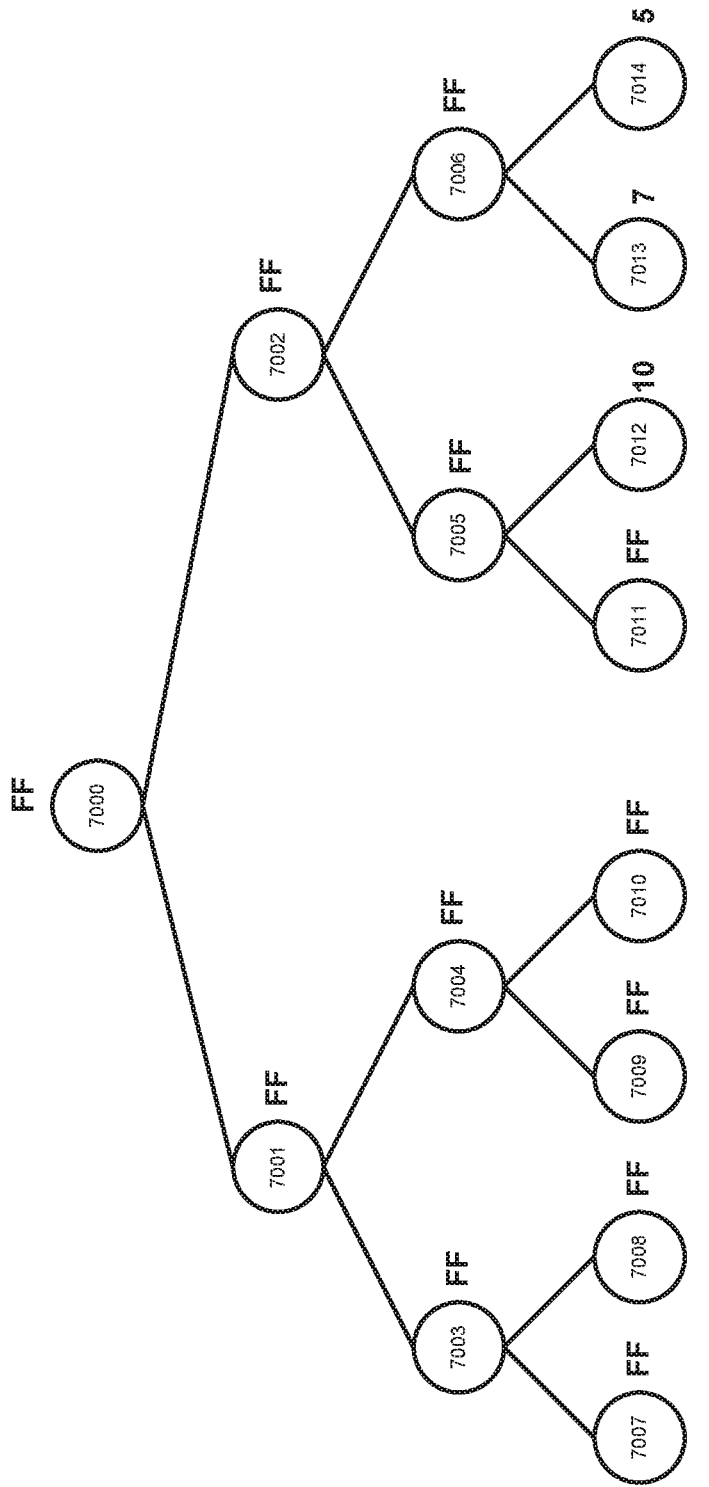
FIG. 7B illustrates an exemplary "maximum" binary tree, according some embodiments of the disclosure.

By way of example, FIGS. 7B-7E provide an example of an implantation of "maximum" binary tree 710. As shown in FIG. 7B, binary tree 710 includes 15 nodes, and thus, at least three leaf nodes (e.g., nodes 7012-7014) can be initialized at step 702. Data elements from the host system (e.g., host system 110 of FIG. 1C) can be used for the initialization. In some embodiments, one leaf node can be initialized with one data elements within one cycle, and therefore, step 702 can take at least roof ($\log_2^{(K+1)}-1$) cycles. In some embodiments, roof ($\log_2^{(K+1)}-1$) leaf nodes can be initialized within a first cycle. After initialization, as shown in FIG. 7B, nodes 7012-7014 are assigned with "10," "7," and "5."

After the initialization, at step 704, a first data element from the host system (e.g., host system 110 of FIG. 1C) can be stored in the root node of the binary tree. For example, step 704 can be performed in a second cycle. As discussed above, the host system can store data elements to be processed in a queue, and sequentially send the data elements to the binary tree. The queue of the host system can store a plurality of data elements. Therefore, the given number of initial data elements and the first data element are part of the plurality of data elements in the queue.

Figure 7C:
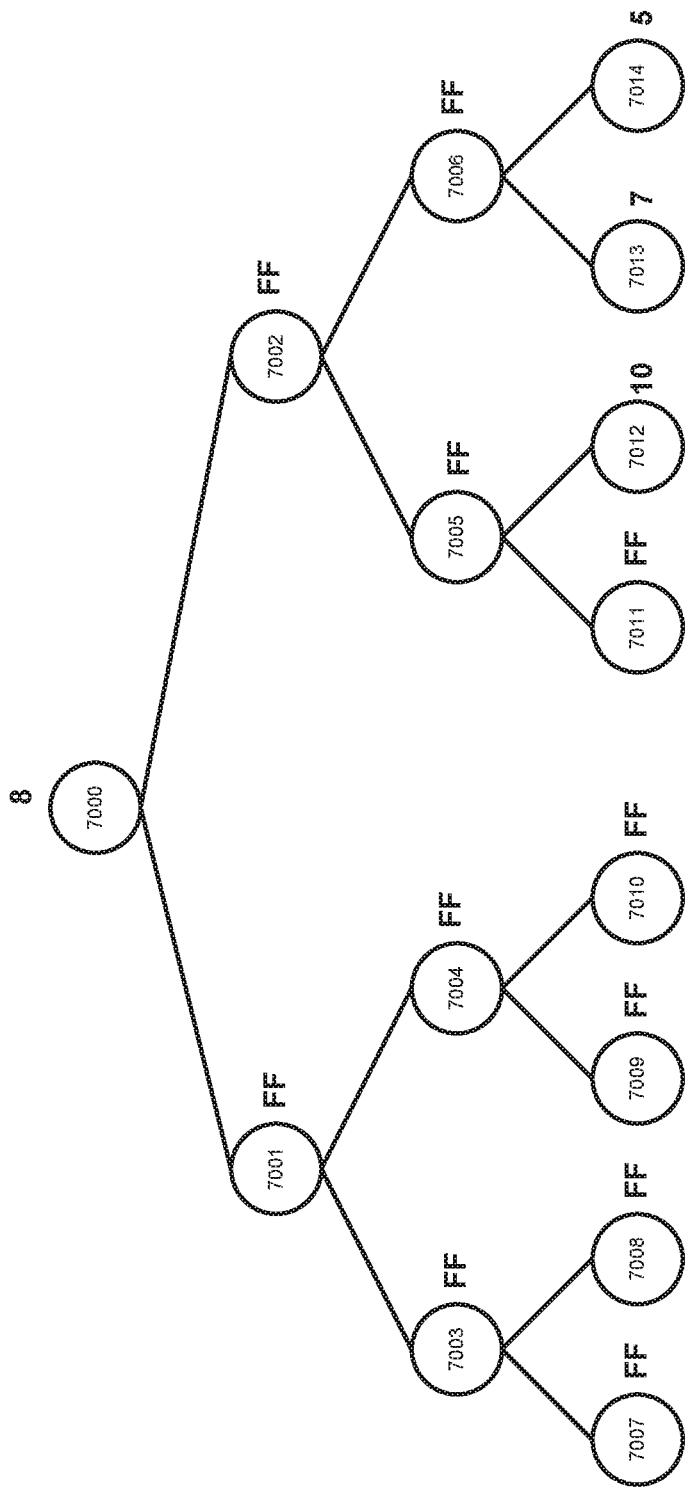
FIG. 7C illustrates another exemplary binary tree, according some embodiments.

FIG. 7C illustrates an exemplary binary tree 720, according some embodiments.

As shown in FIG. 7C, root node 7000 of binary tree 720 is assigned with "8" at step 704.

Figure 7D:
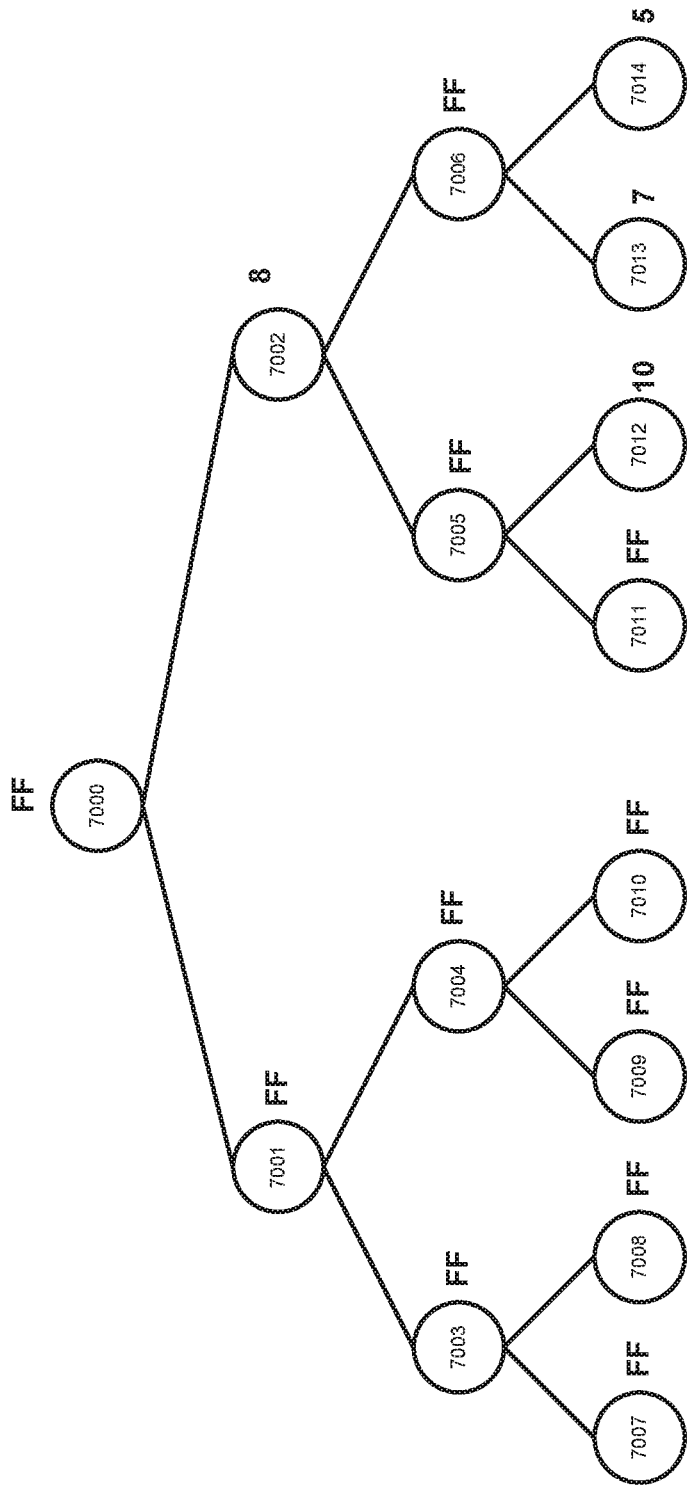
FIG. 7D illustrates yet another exemplary binary tree, according some embodiments.

At step 706, the binary tree can be heapified. It is appreciated that, the heapifying of the binary tree can be performed in a third cycle. For example, the third cycle can be the next cycle of the second cycle. FIG. 7D illustrates an exemplary binary tree 730, according some embodiments. Because binary tree 730 is a "maximum" binary tree, the greatest value can be pushed to the parent node during heapifying. Thus, "FF," which is the data element of node 7002 in FIG. 7C, now is swapped with "8," as shown in FIG. 7D.

At step 708, an uninitialized leaf node of the binary tree can be initialized with a second data element. The second data element is a data element that is next to the first data element in the queue of the host system. It is appreciated that, step 708 can be performed in parallel with step 706. That is, step 708 can be performed in the third cycle.

Figure 7E:
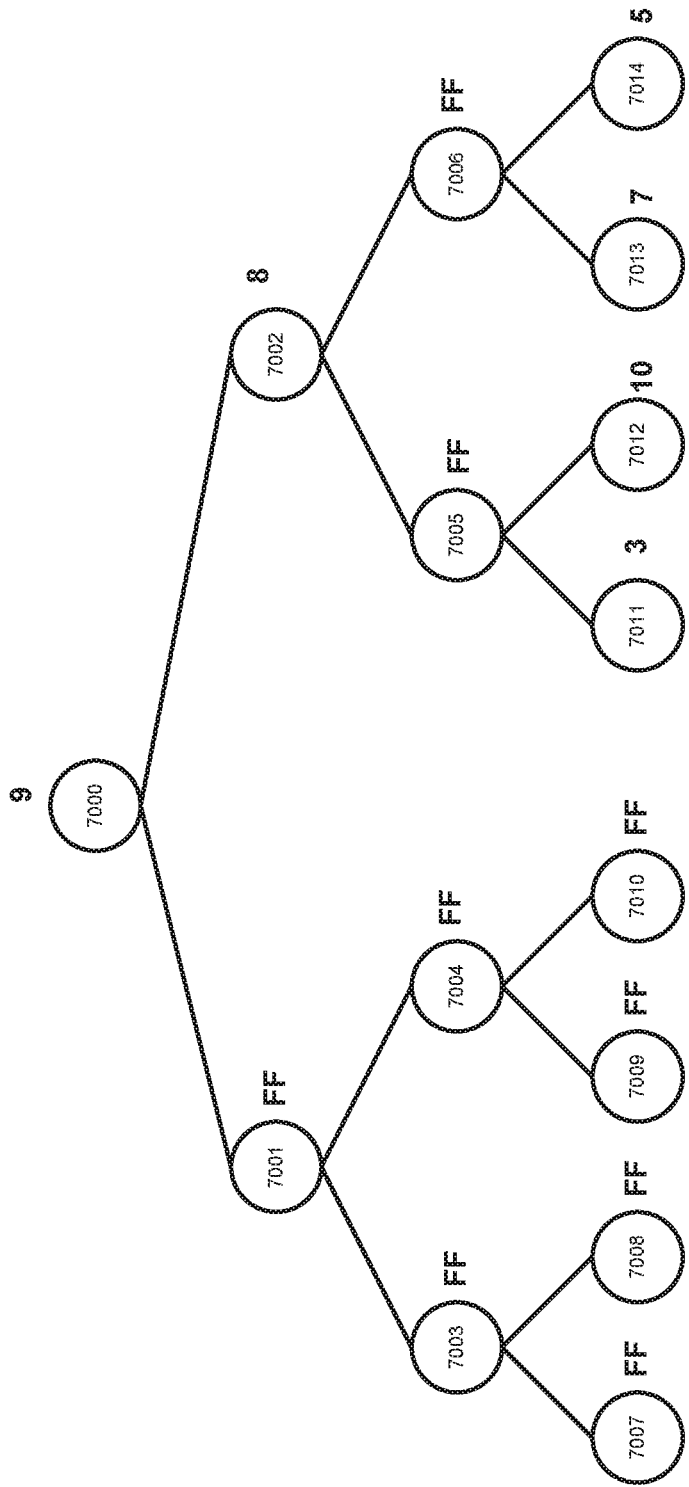
FIG. 7E illustrates yet another exemplary binary tree, according some embodiments.

The above steps 704-708 can be performed repeatedly until all nodes of the binary tree (i.e., K nodes) are filled with first K data elements from the host system. FIG. 7E illustrates an exemplary binary tree 740, according some embodiments. As shown in FIG. 7E, "9" is further pushed to root node 7000 in the next cycle, and leaf node 7011 can be initialized with "3." Then, the binary tree can be heapified. More particularly, a sub-tree of nodes 7000-7002 can be heapified. And the above process can be similarly repeated.

At step 710, the binary tree can sequentially receive data elements to determine top K data elements among all data elements that has been processed by the binary tree. The top K data elements can be the greatest K data elements or the smallest K data element among the plurality of data elements, depending on a type of the binary tree. As discussed above, when the binary tree is a maximum binary heap tree, the top K data elements are the smallest K data elements among the plurality of data elements. When the binary tree is a minimum binary heap tree, the top K data elements are the greatest K data elements among the plurality of data elements.

Figure 8A:
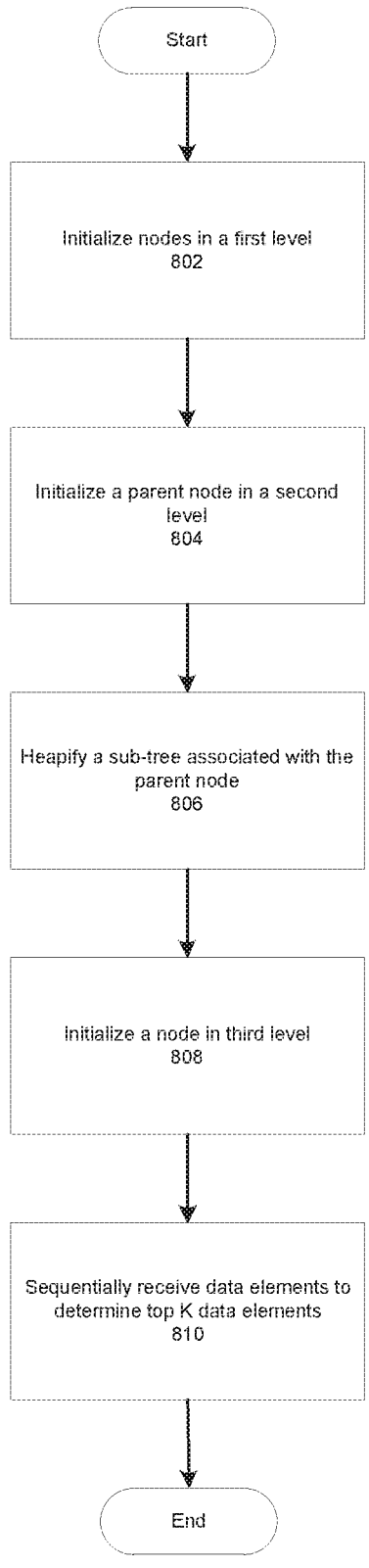
FIG. 8A illustrates a flowchart of an exemplary method for heapifying a binary tree, according to some embodiments of the disclosure.

FIG. 8A illustrates a flowchart of an exemplary method 800 for heapifying a binary tree, according to some embodiments of the disclosure. Method 800 can be performed by a binary tree (e.g., binary tree 100 of FIG. 1A). The binary tree can include a plurality of nodes (e.g., K nodes), which include a root node, leaf nodes, and internal nodes distributed across a plurality of levels (e.g., N levels). The plurality of node levels can include a root level, internal levels, and a leaf level, in an order from a low level to a high level. Method 800 can include steps as below.

At step 802, nodes in a first level can be initialized. The first level can be any level other than the root level. For example, the first level can be a leaf level. In binary tree, the leaf level is the highest level, and includes $2^{N-1}$ leaf nodes. For example, in binary tree 100, the leaf level includes 8 leaf nodes. And thus, $2^{N-1}$ data elements can be assigned to the leaf nodes at step 802. In some embodiments, step 802 can be executed in a first cycle.

Figure 8B:
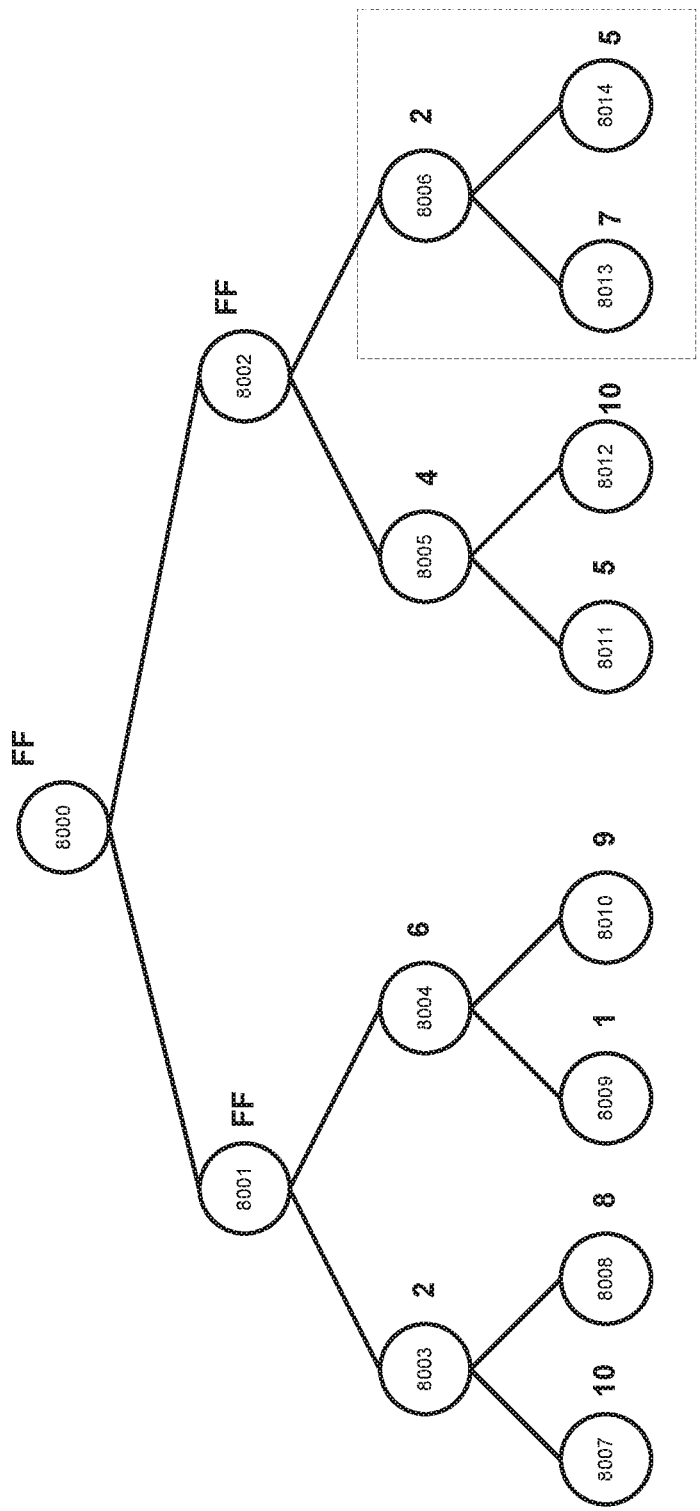
FIG. 8B illustrates an exemplary "maximum" binary tree, according to some embodiments.
Figure 8C:
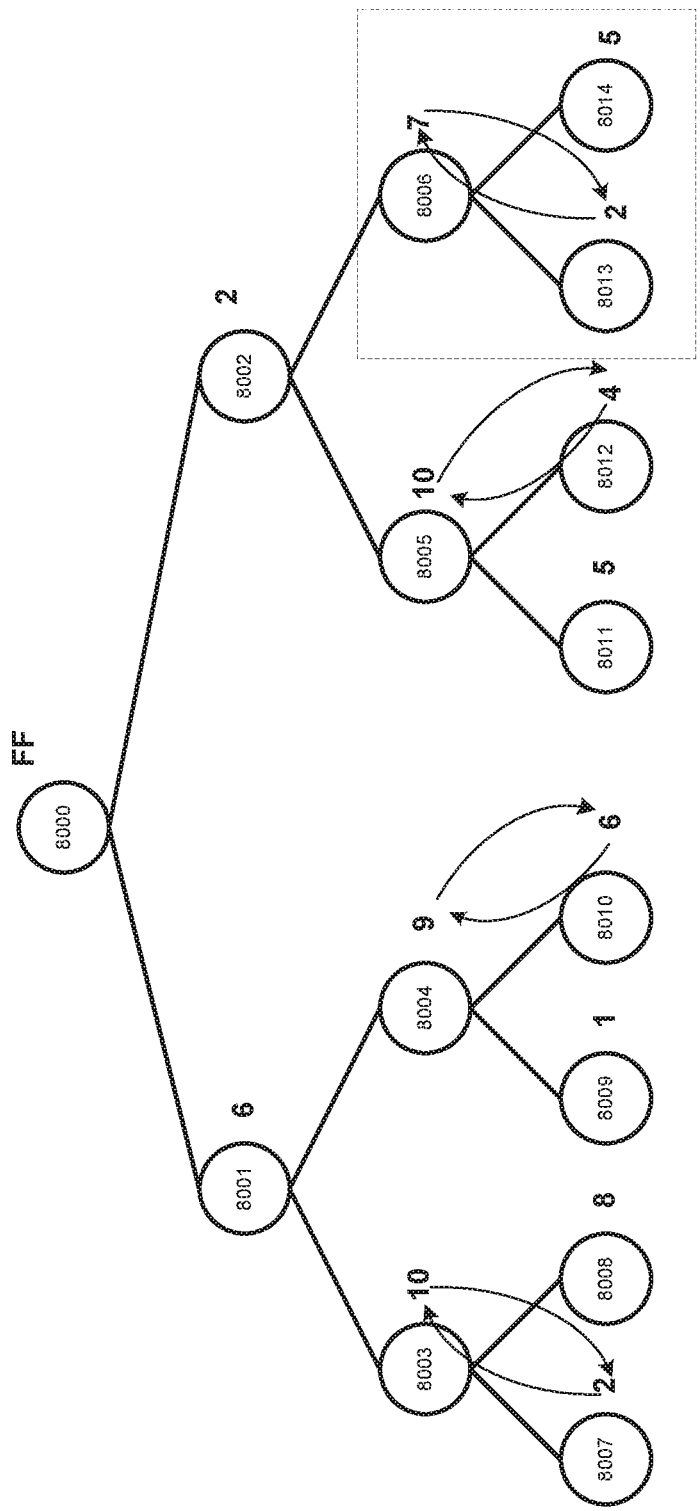
FIG. 8C illustrates an exemplary partially-heapified tree, according to some embodiments.

By way of example, FIGS. 8B-8C provide examples of an implementation of an exemplary "maximum" binary tree 810. As shown in FIG. 8B, leaf nodes 8007-8014 have been initialized with "10," "8," "1," "9," "5," "10," "7," and "5".

At step 804, a parent node in a second level can be initialized. The second level can be a parent level of the first level. As the parent level of the first level, the parent node in the second level can be a parent of two nodes in the first level. In other words, the parent node in the second level and the corresponding two nodes in the first level can form a sub-tree. In some embodiments, all nodes in the second level can be initialized. In some embodiments, step 804 can be executed in a second cycle.

For example, as shown in FIG. 8B, node 8006, which is the parent of nodes 8013 and 8014, is initialized with "2." In FIG. 8B, nodes 8003-8005 are also initialized at step 804.

At step 806, a sub-tree associated with the parent node can be heapified. For example, in FIG. 8B, the sub-tree associated with node 8006 can be heapified. Similarly, sub-trees associated with nodes 8003-8005 can also be heapified. In some embodiments, step 806 can be executed in a third cycle.

FIG. 8C illustrates an exemplary partially-heapified tree 820, according to some embodiments. As shown in FIG. 8C, the sub-trees associated with nodes 8003-8006 have been heapified, respectively.

At step 808, a node in third level can be initialized. The third level can be a parent level of the second level. As the parent level of the second level, the node in the third level can be a parent of two nodes in the second level. In other words, the node in the third level and the corresponding two nodes in the second level can form a sub-tree. In some embodiments, all nodes in the second level can be initialized. In some embodiments, step 804 can be executed in parallel with step 806. In other words, step 804 can also be executed in the third cycle. As shown in FIG. 8C, while sub-trees associated with nodes 8003-8005 are being heapified, nodes 8001 and 8002 are initialized in parallel.

It is appreciated that sub-trees associated with nodes 8001 and 8002 can be heapified in the next cycle.

Therefore, by iteratively repeating steps 806 and 808, the binary tree can be fully heapified.

At step 810, the binary tree can sequentially receive data elements to determine top K data elements among all data elements that has been processed by the binary tree. The top K data elements can be the greatest K data elements or the smallest K data element among the plurality of data elements, depending on a type of the binary tree. As discussed above, when the binary tree is a maximum binary heap tree, the top K data elements are the smallest K data elements among the plurality of data elements. When the binary tree is a minimum binary heap tree, the top K data elements are the greatest K data elements among the plurality of data elements.

Though above embodiments for performing the Top-k function are implemented using hardware binary trees described with reference to FIGS. 1A-2B, the Top-k function can also be performed by a processor (e.g., host unit 120). Embodiments of the disclosure further provide specific instructions for performing the Top-k function on a processor.

In some embodiments, a data structure for storing data elements of a binary tree can be created in a memory (e.g., host memory 121), and an instruction for performing the Top-k function can be executed to process the data structure.

For example, an exemplary instruction TopK (top_data, left_data, right_data) can be provided. The output of the instruction TopK ( ) can have three possible values (e.g., "4," "0," and "1"). For example, when TopK ( )="−1," a parent data element (e.g., node 1005 of FIG. 1A) can be swapped with a first child data element (e.g., node 1011 of FIG. 1A); when TopK ( )="0," no data elements are swapped; and when TopK ( )="1," a parent data element can be swapped with a second child data element (e.g., node 1012 of FIG. 1A).

Embodiments of the disclosure further provide a binary tree device for heapifying data elements. The device can be specific circuitry designed for performing e.g., the TopK function or a computing system executing the above methods, such as systems and devices described with reference to FIGS. 1A-3.

The device can include a memory (e.g., host memory 121 of FIG. 1C or local memory 1032 of FIG. 1D). The memory can be implemented by storage circuitry (e.g., storage circuitry 202 of FIG. 2A). The device can also include interface circuitry (e.g., interface circuitry 204 of FIG. 2A) and comparison circuitry (e.g., comparison circuitry 206 of FIG. 2A).

In some embodiments, the memory can include a plurality of register files for storing the data elements. It is appreciated that the plurality of register files can also be implemented by storage circuitry. The plurality of register files can include a parent register file (e.g., first level register file 246 of FIG. 2B) and a first child register file (e.g., second level register file 256 of FIG. 2B) associated with the parent register file.

The parent register file can be associated with first interface circuitry and first comparison circuitry.

The first interface circuitry can read a first parent data element from the parent register file and receive a first child data element and a second child data element from the first child register file. In some embodiments, a register file can store data elements for one or more nodes in a level corresponding to the register file. For example, first level register file 246 can store data elements corresponding to nodes 1001 and 1002 of FIG. 1A. Also as an example, second level register file 256 can store data elements corresponding to nodes 1003 and 1004 of FIG. 1A. The first parent data element is associated with a first parent node, the first child data element is associated with a first child node, the second child data element is associated with a second child node. The first parent node can be associated with the first and second child nodes.

The first comparison circuitry (e.g., comparison circuitry 252 of FIG. 2B) can update the parent register file and the first child register file based on the first parent data element, the first child data element, and the second child data element according to a given principle. In some embodiments, the first comparison circuitry can perform a first determination of whether the first parent data element and the first child data element satisfy a first given condition; perform a second determination of whether the first and second child data elements satisfy a second given condition; perform a third determination of whether the first parent data element and the second child data element satisfy a third given condition; and update the parent register file and the first child register file based on the first, second, and third determinations according to the given principle.

The given principle is determined by a type of the binary tree device. For example, when the binary tree device is a minimum binary heap tree device, the given principle can include selecting a minimum data element among the first parent data element, the first child data element, and the second child data element. When the binary heap tree device is a maximum binary heap tree device, the principle can include selecting a maximum data element among the first parent data element, the first child data element, and the second child data element.

In some embodiment, the first given condition can include the first parent data element being less than the first child data element, the second given condition can include the first child data element being less than the second child data element, and the third given condition can include the first parent data element being less than the second child data element. It is appreciated that the first, second, and third given conditions can be changed as long as the minimum/ maximum data element can be determined.

For example, when the given principle includes selecting a minimum data element among the first parent data element, the first child data element, and the second child data element, in updating the parent register file and the first child register file, the first comparison circuitry is further configured for determining whether the first child data element is the minimum data element, and in response to the determination that the first child data element is the minimum data element, swapping the first child data element and the first parent data element between the first parent node and the first child node; or determining whether the second child data element is the minimum data element, and in response to the determination that the second child data element is the minimum data element, swapping the second child data element and the first parent data element between the first parent node and the second child node. It is appreciated that if the first parent data element is the minimum data element, there is no need to swap any data elements.

Similarly, when the given principle includes selecting a maximum data element among the first parent data element, the first child data element, and the second child data element, in updating the non-leaf node, the first child node, and the second child node, the first comparison circuitry is further configured for: determining whether the first child data element is the maximum data element, and in response to the determination that the first child data element is the maximum data element, swapping the first child data element and the first parent data element between the first parent node and the first child node; or determining whether the second child data element is the maximum data element, and in response to the determination that the second child data element is the maximum data element, swapping the second child data element and the first parent data element between the first parent node and the second child node. Also, it is appreciated that if the first parent data element is the maximum data element, there is no need to swap any data elements.

In some embodiments, the plurality of register files can further include a second child register file (e.g., second level register file 258 of FIG. 2B) associated with the parent register file (e.g., first level register file 246). The second child register file can include a third child data element and a fourth data element.

The first interface circuitry is further configured for reading a second parent data element (e.g., the data element corresponding to node 1002 of FIG. 1A) from the parent register file and receiving the third child data element and the fourth data element (e.g., the data elements corresponding to nodes 1003 and 1004 of FIG. 1A) from the second child register file.

Accordingly, the second parent data element is associated with a second parent node, the third child data element is associated with a third child node, the fourth child data element is associated with a fourth child node. The second parent node can be associated with the third and fourth child nodes.

And the device can further include second comparison circuitry (e.g., comparison circuitry 254 of FIG. 2B). The second comparison circuitry can be configured for updating the parent register file and the second child register file based on the second parent data element, the third child data element, and the fourth child data element according to the given principle.

In some embodiments, the device can further include second interface circuitry configured for receiving an initial data element from a host system for initializing the first parent node. For example, as shown in FIG. 2A, interface circuitry 204 can also be configured to receive an initial data element.

In some embodiments, the first child register file can be a leaf register file (e.g., leaf register file 264 of FIG. 2B). And the leaf register file is associated with: third interface circuitry configured for sending the first child data element to the first interface circuitry associated with the parent register file; and fourth interface circuitry configured for receiving an initial data element from a host system for initializing the first child node.

It is appreciated that, though multiple types of interface circuitry are provided, one type of interface circuitry can be multiplexed for performing different functions.

Embodiments of the disclosure also provide a computer program product. The computer program product may include a non-transitory computer readable storage medium having computer readable program instructions thereon for causing a processor to carry out the above-described methods.

The computer readable storage medium may be a tangible device that can store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

The computer readable program instructions for carrying out the above-described methods may be assembler instructions, instruction-set-architecture (ISA) instructions, machine instructions, machine dependent instructions, microcode, firmware instructions, state-setting data, or source code or object code written in any combination of one or more programming languages, including an object-oriented programming language, and conventional procedural programming languages. The computer readable program instructions may execute entirely on a computer system as a stand-alone software package, or partly on a first computer and partly on a second computer remote from the first computer. In the latter scenario, the second, remote computer may be connected to the first computer through any type of network, including a local area network (LAN) or a wide area network (WAN).

The computer readable program instructions may be provided to a processor of a computer, or other programmable data processing apparatus to produce a machine, such that the instructions, which execute via the processor of the computer or other programmable data processing apparatus, create means for implementing the above-described methods.

The flow charts and diagrams in the figures illustrate the architecture, functionality, and operation of possible implementations of devices, methods, and computing program products according to various embodiments of the specification. In this regard, a block in the flow charts or diagrams may represent a software program, segment, or portion of code, which comprises one or more executable instructions for implementing specific functions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the diagrams or flow charts, and combinations of blocks in the diagrams and flow charts, may be implemented by special purpose hardware-based systems that perform the specified functions or acts, or combinations of special purpose hardware and computer instructions.

The embodiments may further be described using the following clauses:

1. A binary tree device for heapifying data elements, comprising:

a memory comprising a plurality of register files for storing the data elements, the plurality of register files comprising a parent register file and a first child register file associated with the parent register file, wherein the parent register file is associated with:

first interface circuitry configured for reading a first parent data element from the parent register file and receiving a first child data element and a second child data element from the first child register file; and first comparison circuitry configured for updating the parent register file and the first child register file based on the first parent data element, the first child data element, and the second child data element according to a given principle.

2. The device according to clause 1, wherein, before the updating, the first parent data element is associated with a first parent node, the first child data element is associated with a first child node, the second child data element is associated with a second child node, the first parent node being associated with the first and second child nodes.

3. The device according clause 2, wherein in updating the parent register file and the first child register file, the first comparison circuitry is further configured for:

performing a first determination of whether the first parent data element and the first child data element satisfy a first given condition;

performing a second determination of whether the first and second child data elements satisfy a second given condition;

performing a third determination of whether the first parent data element and the second child data element satisfy a third given condition; and updating the parent register file and the first child register file based on the first, second, and third determinations according to the given principle.

4. The device according to clause 3, wherein the given principle comprises selecting a minimum data element among the first parent data element, the first child data element, and the second child data element, or selecting a maximum data element among the first parent data element, the first child data element, and the second child data element;

the first given condition comprises the first parent data element being less than the first child data element;

the second given condition comprises the first child data element being less than the second child data element;

the third given condition comprises the first parent data element being less than the second child data element.

5. The device according to clause 4, wherein when the given principle comprises selecting a minimum data element among the first parent data element, the first child data element, and the second child data element, in updating the parent register file and the first child register file, the first comparison circuitry is further configured for:

determining whether the first child data element is the minimum data element, and in response to the determination that the first child data element is the minimum data element, swapping the first child data element and the first parent data element between the first parent node and the first child node; or determining whether the second child data element is the minimum data element, and in response to the determination that the second child data element is the minimum data element, swapping the second child data element and the first parent data element between the first parent node and the second child node.

6. The device according to clause 4 or 5, wherein when the given principle comprises selecting a maximum data element among the first parent data element, the first child data element, and the second child data element, in updating the non-leaf node, the first child node, and the second child node, the first comparison circuitry is further configured for:

determining whether the first child data element is the maximum data element, and in response to the determination that the first child data element is the maximum data element, swapping the first child data element and the first parent data element between the first parent node and the first child node; or determining whether the second child data element is the maximum data element, and in response to the determination that the second child data element is the maximum data element, swapping the second child data element and the first parent data element between the first parent node and the second child node.

7. The device according to any one of clauses 1-6, wherein the plurality of register files further comprises a second child register file associated with the parent register file, the second child register file further comprises a third child data element and a fourth child data element, the first interface circuitry is further configured for reading a second parent data element from the parent register file and receiving the third child data element and the fourth data element from the second child register file, and the device further comprises:

second comparison circuitry configured for updating the parent register file and the second child register file based on the second parent data element, the third child data element, and the fourth child data element according to the given principle.

8. The device according to clause 7, wherein the second parent data element is associated with a second parent node, the third child data element is associated with a third child node, the fourth child data element is associated with a fourth child node, the second parent node being associated with the third and fourth child nodes.

9. The device according to any one of clauses 2-8, further comprising:

second interface circuitry configured for receiving an initial data element from a host system for initializing the first parent node.

10. The device according to any one of clauses 2-9, wherein the first child register file is a leaf register file, and the leaf register file is associated with:

third interface circuitry configured for sending the first child data element to the first interface circuitry associated with the parent register file; and fourth interface circuitry configured for receiving an initial data element from a host system for initializing the first child node.

11. A method for heapifying a binary tree that comprises K nodes distributed across N node levels, the method comprising:

initializing the K nodes of the binary tree with K initial data elements from a host system, wherein the N node levels comprises a first node level, a second node level that is a child level of the first node level, a third node level that is a child level of the second node level, and a fourth node level that is a child level of the third node level; and heapifying the binary tree, wherein heapifying the binary tree comprises:
  heapifying nodes of the first node level and the third node level in a first cycle; and
  heapifying nodes of the second node level in a second cycle.

12. The method according to clause 11, wherein heapifying the nodes comprises:
  receiving, among the nodes, a parent data element for a node, a first child data element for a first child node of the node, and a second child data element for a second child data of the node;
  determining a maximum or minimum data element among the parent data element, the first child data element, and the second child data element; and
  updating the node using the determined maximum or minimum data element.

13. The method according to clause 11 or 12, wherein the K initial data elements are first K data elements of a plurality of data elements to be processed.

14. The method according to clause 13, further comprising:
  sequentially receiving data elements from the host system; and
  determining top K data elements among the received data elements and the K initial data elements.

15. The method according to clause 14, wherein
  when the binary tree is a maximum binary heap tree, the top K data elements comprises smallest K data elements among the received data elements and the K initial data elements; or
  when the binary tree is a minimum binary heap tree, the top K data elements comprises greatest K data elements among the received data elements and the K initial data elements.

16. The method according to any one of clauses 11-15, wherein the first node level is a root level, and the first node level comprises a root node of the binary tree.

17. The method according to any one of clauses 11-16, wherein the fourth node level is a leaf level, and the fourth node level comprises $2^{N-1}$ leaf nodes.

18. The method according to any one of clauses 11-17, wherein the second cycle is a cycle next to the first cycle.

19. A method for heapifying a binary tree that comprises a root node, a number of leaf nodes, and internal nodes between the root node and the leaf nodes, the method comprising:
  initializing the number of leaf nodes of the binary tree with a plurality of initial data elements in a first cycle;
  storing a first data element from a host system to the root node of the binary tree in a second cycle that is next to the first cycle; and
  heapifying the binary tree in a third cycle that is next to the second cycle.

20. The method according to clause 19, wherein heapifying the binary tree comprises heapifying nodes of the binary tree, wherein heapifying the nodes further comprises:
  receiving, among the nodes, a parent data element for a node, a first child data element for a first child node of the node, and a second child data element for a second child data of the node;
  determining a maximum or minimum data element among the parent data element, the first child data element, and the second child data element; and
  updating the node using the determined maximum or minimum data element.

21. The method according to clause 19 or 20, further comprising:
  storing a second data element from the host system to the root node of the binary tree in a fourth cycle that is next to the third cycle.

22. The method according to any one of clauses 19-21, further comprising:
  sequentially receiving data elements from the host system; and determining a number of top data elements among the received data elements and the plurality of initial data elements using the heapified binary tree.

23. A method for heapifying a binary tree comprising K nodes across N levels, wherein the K nodes comprise a root node, leaf nodes, and internal nodes between the root node and the leaf nodes, the method comprising:
  initializing a given number of the leaf nodes of the binary tree in a first cycle, wherein the given number is an integer equal to or greater than $(\log_2^{(K+1)}-1)$;
  storing a first data element from the host system to the root node of the binary tree in a second cycle; and
  heapifying the K nodes the binary tree in a third cycle.

24. The method according to clause 23, wherein heapifying the K nodes of the binary tree, further comprises:
  receiving, among the K nodes, a parent data element for a node, a first child data element for a first child node of the node, and a second child data element for a second child data of the node;
  determining a maximum or minimum data element among the parent data element, the first child data element, and the second child data element; and
  updating the node using the determined maximum or minimum data element.

25. The method according to clause 23 or 24, wherein initializing the given number of the leaf nodes of the binary tree in the first cycle further comprises:
  receiving the given number of initial data elements from the host system; and
  storing the given number of initial data elements to the given number of initial data elements, respectively.

26. The method according any one of clauses 22-25, wherein the host system stores a plurality of data elements to be processed in a queue, and the given number of initial data elements and the first data element are part of the plurality of data elements to be processed.

27. The method according any one of clauses 23-26, further comprising:
  initializing an uninitialized leaf node in the third cycle with a second data element, wherein
  the second data element is next to the first data element in the queue.

28. The method according to any one of clauses 23-26, further comprising:
  sequentially receiving data elements from the host system; and
  determining a number of top data elements among the plurality of data elements using the heapified binary tree.

29. A method for heapifying a binary tree that comprises a plurality of nodes having a root node, leaf nodes, and internal nodes distributed across a plurality of levels, the plurality of node levels comprising a root level corresponding to the root node, internal levels corresponding to the internal nodes, and a leaf level corresponding to the leaf nodes, in an order from a low level to a high level, the method comprising:

initializing nodes in a first node level in the plurality of node levels in a first cycle;

initializing a parent node in a second node level that is a parent level of the first node level in a second cycle; and heapifying a sub-tree associated with the parent node in a third cycle.

30. The method according to clause 29, wherein heapifying the sub-tree associated with the parent node further comprises:

determining a maximum or minimum data element among a parent data element of the parent node in the second node level and two child data elements associated with the parent node in the first node level; and updating the parent node using the determined maximum or minimum data element.

31. The method according clause 29 or 30, wherein the first node level is any of the internal levels and the leaf level.

32. The method according to clause 31, wherein initializing the parent node in the second level that is the parent level of the first node level in the second cycle further comprises:

initializing all nodes in the second node level in the second cycle.

33. The method according to clause 32, further comprising:

initializing nodes in a third node level that is a parent level of the second node level.

34. The method according to clause 33, wherein the nodes in the third node level are initialized in the third cycle.

35. The method according to any one of clauses 29-34, wherein initializing nodes in the first node level in the plurality of node levels further comprises:

receiving, from a host system, initial data elements corresponding to the nodes in the first node level; and storing the initial data elements to the nodes in the first node level, respectively.

36. The method according to any one of clauses 29-35, further comprising:

sequentially receiving data elements from the host system; and determining a number of top data elements among the received data elements and the plurality of initial data elements using the heapified binary tree.

37. A non-transitory computer readable medium that stores a set of instructions that is executable by at least one processor of a computer system to cause the computer system to perform a method for heapifying a binary tree that comprises K nodes distributed across N node levels, the method comprising:

initializing the K nodes of the binary tree with K initial data elements from a host system, wherein the N node levels comprises a first node level, a second node level that is a child level of the first node level, a third node level that is a child level of the second node level, and a fourth node level that is a child level of the third node level; and heapifying the binary tree, wherein heapifying the binary tree comprises:

heapifying nodes of the first node level and the third node level in a first cycle; and heapifying nodes of the second node level in a second cycle.

38. The non-transitory computer readable medium according to clause 37, wherein heapifying the nodes further comprises:

receiving, among the nodes, a parent data element for a node, a first child data element for a first child node of the node, and a second child data element for a second child data of the node;

determining a maximum or minimum data element among the parent data element, the first child data element, and the second child data element; and updating the node using the determined maximum or minimum data element.

39. The non-transitory computer readable medium according to clause 37 or 38, wherein the K initial data elements are first K data elements of a plurality of data elements to be processed.

40. The non-transitory computer readable medium according to clause 39, wherein the set of instructions is executable by the at least one processor of the computer system to cause the computer system to perform:

sequentially receiving data elements from the host system; and determining top K data elements among the received data elements and the K initial data elements.

41. The non-transitory computer readable medium according to clause 40, wherein when the binary tree is a maximum binary heap tree, the top K data elements comprises smallest K data elements among the received data elements and the K initial data elements; or when the binary tree is a minimum binary heap tree, the top K data elements comprises greatest K data elements among the received data elements and the K initial data elements.

42. The non-transitory computer readable medium according to any one of clauses 37-41, wherein the first node level is a root level, and the first node level comprises a root node of the binary tree.

43. The non-transitory computer readable medium according to any one of clauses 37-42, wherein the fourth node level is a leaf level, and the fourth node level comprises $2^{N-1}$ leaf nodes.

44. The non-transitory computer readable medium according to any one of clauses 37-43, wherein the second cycle is a cycle next to the first cycle.

45. A non-transitory computer readable medium that stores a set of instructions that is executable by at least one processor of a computer system to cause the computer system to perform a method for heapifying a binary tree that comprises a root node, a number of leaf nodes, and internal nodes between the root node and the leaf nodes, the method comprising:

initializing the number of leaf nodes of the binary tree with a plurality of initial data elements in a first cycle;

storing a first data element from a host system to the root node of the binary tree in a second cycle that is next to the first cycle; and heapifying the binary tree in a third cycle that is next to the second cycle.

46. The non-transitory computer readable medium according to clause 45, wherein the set of instructions is executable by the at least one processor of the computer system to cause the computer system to perform:

storing a second data element from the host system to the root node of the binary tree in a fourth cycle that is next to the third cycle.

47. The non-transitory computer readable medium according to clause 45 or 46, wherein the set of instructions is executable by the at least one processor of the computer system to cause the computer system to perform:

sequentially receiving data elements from the host system; and determining a number of top data elements among the received data elements and the plurality of initial data elements using the heapified binary tree.

48. A non-transitory computer readable medium for heapifying a binary tree comprising K nodes across N levels, wherein the K nodes comprise a root node, leaf nodes, and internal nodes between the root node and the leaf nodes, the method comprising:

initializing a given number of the leaf nodes of the binary tree in a first cycle, wherein the given number is an integer equal to or greater than $(\log_2^{(K+1)}-1)$;

storing a first data element from the host system to the root node of the binary tree in a second cycle; and heapifying the K nodes of the binary tree in a third cycle.

49. The non-transitory computer readable medium according to clause 48 wherein heapifying the K nodes of the binary tree further comprises:

receiving, among the K nodes, a parent data element for a node, a first child data element for a first child node of the node, and a second child data element for a second child data of the node;

determining a maximum or minimum data element among the parent data element, the first child data element, and the second child data element; and updating the node using the determined maximum or minimum data element.

50. The non-transitory computer readable medium according to clause 48 or 49, wherein initializing the given number of the leaf nodes of the binary tree in the first cycle further comprises:

receiving the given number of initial data elements from the host system; and storing the given number of initial data elements to the given number of initial data elements, respectively.

51. The non-transitory computer readable medium according clause 50, wherein the host system stores a plurality of data elements to be processed in a queue, and the given number of initial data elements and the first data element are part of the plurality of data elements to be processed.

52. The non-transitory computer readable medium according clause 51, wherein the set of instructions is executable by the at least one processor of the computer system to cause the computer system to perform:

initializing an uninitialized leaf node in the third cycle with a second data element, wherein the second data element is next to the first data element in the queue.

53. The non-transitory computer readable medium according to clause 51 or 52, wherein the set of instructions is executable by the at least one processor of the computer system to cause the computer system to perform:

sequentially receiving data elements from the host system; and determining a number of top data elements among the plurality of data elements using the heapified binary tree.

54. A non-transitory computer readable medium that stores a set of instructions that is executable by at least one processor of a computer system to cause the computer system to perform a method for heapifying a binary tree that comprises a plurality of nodes having a root node, leaf nodes, and internal nodes distributed across a plurality of levels, the plurality of node levels comprising a root level corresponding to the root node, internal levels corresponding to the internal nodes, and a leaf level corresponding to the leaf nodes, in an order from a low level to a high level, the method comprising:

initializing nodes in a first node level in the plurality of node levels in a first cycle;

initializing a parent node in a second node level that is a parent level of the first node level in a second cycle; and heapifying a sub-tree associated with the parent node in a third cycle.

55. The non-transitory computer readable medium according to clause 54, wherein heapifying the sub-tree associated with the parent node further comprises:

determining a maximum or minimum data element among a parent data element of the parent node in the second node level and two child data elements associated with the parent node in the first node level; and updating the parent node using the determined maximum or minimum data element.

56. The non-transitory computer readable medium according clause 54 or 55, wherein the first node level is any of the internal levels and the leaf level.

57. The non-transitory computer readable medium according to clause 56, wherein initializing the parent node in the second node level that is the parent level of the first node level in the second cycle further comprises:

initializing all nodes in the second node level in the second cycle.

58. The non-transitory computer readable medium according to clause 57, wherein the set of instructions is executable by the at least one processor of the computer system to cause the computer system to perform:

initializing nodes in a third node level that is a parent level of the second node level.

59. The non-transitory computer readable medium according to clause 58, wherein the nodes in the third node level are initialized in the third cycle.

60. The non-transitory computer readable medium according to any one of clauses 54-59, wherein initializing nodes in the first node level in the plurality of node levels further comprises:

receiving, from a host system, initial data elements corresponding to the nodes in the first node level; and storing the initial data elements to the nodes in the first node level, respectively.

61. The non-transitory computer readable medium according to any one of clauses 54-60, wherein the set of instructions is executable by the at least one processor of the computer system to cause the computer system to perform:

sequentially receiving data elements from the host system; and determining a number of top data elements among the received data elements and the plurality of initial data elements using the heapified binary tree.

As used herein, the terms "comprises," "comprising," or any other variation thereof are intended to cover a non-exclusive inclusion, such that a process, method, composition, article, or apparatus that comprises a list of elements does not include only those elements but may include other elements not expressly listed or inherent to such process, method, composition, article, or apparatus. The term "exemplary" is used in the sense of "example" rather than "ideal."

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that certain features of the specification, which are, for clarity, described in the context of separate embodiments, may also be provided in combination in a single embodiment. Conversely, various features of the specification, which are, for brevity, described in the context of a single embodiment, may also be provided separately or in any suitable subcombination or as suitable in any other described embodiment of the specification. Certain features described in the context of various embodiments are not to be considered essential features of those embodiments, unless the embodiment is inoperative without those elements.

What is claimed is:

1. A computer processing unit for heapifying data elements, comprising:
    a memory comprising storage circuitry forming a plurality of register files for storing the data elements, the plurality of register files comprising a parent register file and a first child register file associated with the parent register file;
    a plurality of hardware nodes including a parent hardware node and children hardware nodes, each parent hardware node comprising:
        first interface circuitry associated with the parent register file and configured for reading a first parent data element from the parent register file and receiving a first child data element and a second child data element from the first child register file; and
        first comparison circuitry associated with the parent register file and configured for updating the parent register file and the first child register file, by generating one or more indication signals, based on the first parent data element, the first child data element, and the second child data element according to a given principle;
    a multiplexer configured to transceive data elements with other hardware nodes, wherein the first comparison circuitry is configured to receive the first parent data element, the first child data element, and the second child data element from the multiplexer and sequentially perform comparison on two of the first parent data element, the first child data element, and the second child data element.

2. The computer processing unit according to claim 1, wherein, before the updating, the first parent data element is associated with a first parent node of the plurality of hardware nodes, the first child data element is associated with a first child node of the plurality of hardware nodes, the second child data element is associated with a second child node of the plurality of hardware nodes, the first parent node being associated with the first and second child nodes.

3. The computer processing unit according to claim 2, wherein in updating the parent register file and the first child register file, the first comparison circuitry is further configured for:
    performing a first determination of whether the first parent data element and the first child data element satisfy a first given condition;
    performing a second determination of whether the first and second child data elements satisfy a second given condition;
    performing a third determination of whether the first parent data element and the second child data element satisfy a third given condition; and
    updating the parent register file and the first child register file based on the first, second, and third determinations according to the given principle.

4. The computer processing unit according to claim 3, wherein
    the given principle comprises selecting a minimum data element among the first parent data element, the first child data element, and the second child data element, or selecting a maximum data element among the first parent data element, the first child data element, and the second child data element;
    the first given condition comprises the first parent data element being less than the first child data element;
    the second given condition comprises the first child data element being less than the second child data element;
    the third given condition comprises the first parent data element being less than the second child data element.

5. The computer processing unit according to claim 4, wherein when the given principle comprises selecting a minimum data element among the first parent data element, the first child data element, and the second child data element, in updating the parent register file and the first child register file, the first comparison circuitry is further configured for:
    determining whether the first child data element is the minimum data element, and
    in response to the determination that the first child data element is the minimum data element, swapping the first child data element and the first parent data element between the first parent node and the first child node; or
    determining whether the second child data element is the minimum data element, and
    in response to the determination that the second child data element is the minimum data element, swapping the second child data element and the first parent data element between the first parent node and the second child node.

6. The computer processing unit according to claim 4, wherein when the given principle comprises selecting a maximum data element among the first parent data element, the first child data element, and the second child data element, in updating a non-leaf node, the first child node, and the second child node, the first comparison circuitry is further configured for:
    determining whether the first child data element is the maximum data element, and
    in response to the determination that the first child data element is the maximum data element, swapping the first child data element and the first parent data element between the first parent node and the first child node; or
    determining whether the second child data element is the maximum data element, and
    in response to the determination that the second child data element is the maximum data element, swapping the second child data element and the first parent data element between the first parent node and the second child node.

7. The computer processing unit according to claim 2, further comprising:
    second interface circuitry configured for receiving an initial data element from a host system for initializing the first parent node.

8. The computer processing unit according to claim 2, wherein the first child register file is a leaf register file, and the leaf register file is associated with:

third interface circuitry configured for sending the first child data element to the first interface circuitry associated with the parent register file; and fourth interface circuitry configured for receiving an initial data element from a host system for initializing the first child node.

9. The computer processing unit according to claim 1, wherein the plurality of register files further comprises a second child register file associated with the parent register file, the second child register file further comprises a third child data element and a fourth child data element, the first interface circuitry is further configured for reading a second parent data element from the parent register file and receiving the third child data element and the fourth data element from the second child register file, and the device further comprises:

second comparison circuitry configured for updating the parent register file and the second child register file based on the second parent data element, the third child data element, and the fourth child data element according to the given principle.

10. The computer processing unit according to claim 9, wherein the second parent data element is associated with a second parent node of the plurality of hardware nodes, the third child data element is associated with a third child node of the plurality of hardware nodes, the fourth child data element is associated with a fourth child node of the plurality of hardware nodes, the second parent node being associated with the third and fourth child nodes.

11. A method for heapifying a hardware binary tree that comprises K nodes distributed across N node levels, each of the K nodes being a hardware node comprising interface circuitry and storage circuitry, wherein K and N are integers greater than three, the method comprising:

assigning and storing K initial data elements received by the interface circuitry of the K nodes from a host system to the storage circuitry of the K nodes, the N node levels comprising a first node level, a second node level that is a child level of the first node level, a third node level that is a child level of the second node level, and a fourth node level that is a child level of the third node level; and heapifying the hardware binary tree by heapifying the first and third node levels and the second node level in an interleaving manner in machine cycles of the host system, by generating one or more indication signals, wherein heapifying the hardware binary tree comprises:

heapifying data elements stored in nodes of the first node level and the third node level in a first cycle of the machine cycles; and heapifying data elements stored in nodes of the second node level in a second cycle of the machine cycles, wherein heapifying the data elements stored in the nodes comprises receiving the data elements from a corresponding multiplexer, sequentially performing comparison on two of the received data elements, and updating the node according to a result of the comparison.

12. The method according to claim 11, wherein heapifying the data elements stored in the nodes comprises:

receiving, among the nodes, a parent data element for a node, a first child data element for a first child node of the node, and a second child data element for a second child data of the node;

determining a maximum or minimum data element among the parent data element, the first child data element, and the second child data element; and updating the node using the determined maximum or minimum data element.

13. The method according to claim 11, wherein the K initial data elements are first K data elements of a plurality of data elements to be processed.

14. The method according to claim 13, further comprising:

sequentially receiving the data elements from the host system; and determining top K data elements among the received data elements and the K initial data elements.

15. The method according to claim 14, wherein when the hardware binary tree is a maximum binary heap tree, the top K data elements comprises smallest K data elements among the received data elements and the K initial data elements; or when the hardware binary tree is a minimum binary heap tree, the top K data elements comprises greatest K data elements among the received data elements and the K initial data elements.

16. A non-transitory computer readable medium that stores a set of instructions that is executable by at least one processor of a computer system to cause the computer system to perform a method for heapifying a hardware binary tree that comprises K nodes distributed across N node levels, each of the K nodes being a hardware node comprising interface circuitry and storage circuitry, wherein K and N are integers greater than three, the method comprising:

assigning and storing K initial data elements received by the interface circuitry of the K nodes from a host system to the storage circuitry of the K nodes, the N node levels comprising a first node level, a second node level that is a child level of the first node level, a third node level that is a child level of the second node level, and a fourth node level that is a child level of the third node level; and heapifying the hardware binary tree by heapifying the first and third node levels and the second node level in an interleaving manner in machine cycles of the host system, by generating one or more indication signals, wherein heapifying the hardware binary tree comprises:

heapifying data elements stored in nodes of the first node level and the third node level in a first cycle of the machine cycles; and heapifying data elements stored in nodes of the second node level in a second cycle of the machine cycles, wherein heapifying the data elements stored in the nodes comprises receiving the data elements from a corresponding multiplexer, sequentially performing comparison on two of the received data elements, and updating the node according to a result of the comparison.

17. The non-transitory computer readable medium according to claim 16, wherein heapifying the data elements stored in the nodes further comprises:

receiving, among the nodes, a parent data element for a node, a first child data element for a first child node of the node, and a second child data element for a second child data of the node;

determining a maximum or minimum data element among the parent data element, the first child data element, and the second child data element; and updating the node using the determined maximum or minimum data element.

18. The non-transitory computer readable medium according to claim 16, wherein the K initial data elements are first K data elements of a plurality of data elements to be processed.

19. The non-transitory computer readable medium according to claim 18, wherein the set of instructions is executable by the at least one processor of the computer system to cause the computer system to perform:
  sequentially receiving the data elements from the host system; and
  determining top K data elements among the received data elements and the K initial data elements.

* * * * *